(12) United States Patent
Samid

(10) Patent No.: US 11,386,406 B2
(45) Date of Patent: Jul. 12, 2022

(54) **BITMINT*LEVEL: DECENTRALIZED MATHEMATICS DIGITAL COIN * QUANTUM SAFE, ROBUST ANONYMITY**

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 17/537,381

(22) Filed: Nov. 29, 2021

(65) Prior Publication Data

US 2022/0083989 A1    Mar. 17, 2022

Related U.S. Application Data

(63) Continuation-in-part of application No. 15/582,784, filed on May 1, 2017, now Pat. No. 10,956,878, which is a continuation of application No. 14/352,994, filed as application No. PCT/US2012/061331 on Oct. 22, 2012, now abandoned, said application No. 15/582,784 is a continuation-in-part of application No. 15/337,203, filed on Oct. 28, 2016, now abandoned, which is a continuation of application No. 14/737,924, filed on Jun. 12, 2015, now abandoned, which is a continuation of application No. 13/529,399, filed on Jun. 21, 2012, now abandoned, which is a continuation of application No. 12/081,412, filed on Apr. 15, 2008, now Pat. No. 8,229,859, application No. 17/537,381, filed on Nov. 29, 2021, which is a continuation-in-part of application No. 17/207,694, filed on Mar. 21, 2021, now Pat. No. 11,188,886.

(60) Provisional application No. 61/627,977, filed on Oct. 22, 2011, provisional application No. 61/688,788, filed on May 22, 2012, provisional application No.
(Continued)

(51) Int. Cl.
| | | |
|---|---|---|
| G06Q 20/06 | (2012.01) |
| G06Q 30/06 | (2012.01) |
| G06Q 20/14 | (2012.01) |
| G06Q 20/22 | (2012.01) |
| G06Q 20/38 | (2012.01) |
| G06Q 20/36 | (2012.01) |

(52) U.S. Cl.
CPC ....... *G06Q 20/0655* (2013.01); *G06Q 20/065* (2013.01); *G06Q 20/145* (2013.01); *G06Q 20/29* (2013.01); *G06Q 20/3678* (2013.01); *G06Q 20/382* (2013.01); *G06Q 30/06* (2013.01)

(58) Field of Classification Search
None
See application file for complete search history.

(56) References Cited

U.S. PATENT DOCUMENTS

| | | | | |
|---|---|---|---|---|
| 2021/0182806 A1* | 6/2021 | Ornelas | ................ | H04L 9/0897 |
| 2021/0350359 A1* | 11/2021 | Silverman | ............. | G06Q 40/02 |
| 2022/0058627 A1* | 2/2022 | Yantis | ................. | G06Q 20/326 |

OTHER PUBLICATIONS

Cryptopedia Staff, "What are Public and Private Keys", Sep. 8, 2021 (Year: 2021).*

* cited by examiner

*Primary Examiner* — Jacob C. Coppola
*Assistant Examiner* — Timothy Paul Sax

(57) ABSTRACT

Extracting the beneficial elements from Bitcoin, discarding the negative aspects of this ground breaking currency, BitMint*LeVeL replaces the single public/private key formula with coin-owner selected surprise formulas to shift security responsibility to the trader, and create a quantum safe currency with robust anonymity while maintaining a
(Continued)

smooth extension of legacy currency, and relying on a community of mints (an InterMint) to keep the community in control.

9 Claims, 1 Drawing Sheet

Related U.S. Application Data

60/907,869, filed on Apr. 19, 2007, provisional application No. 60/960,672, filed on Oct. 9, 2007, provisional application No. 63/276,662, filed on Nov. 8, 2021.

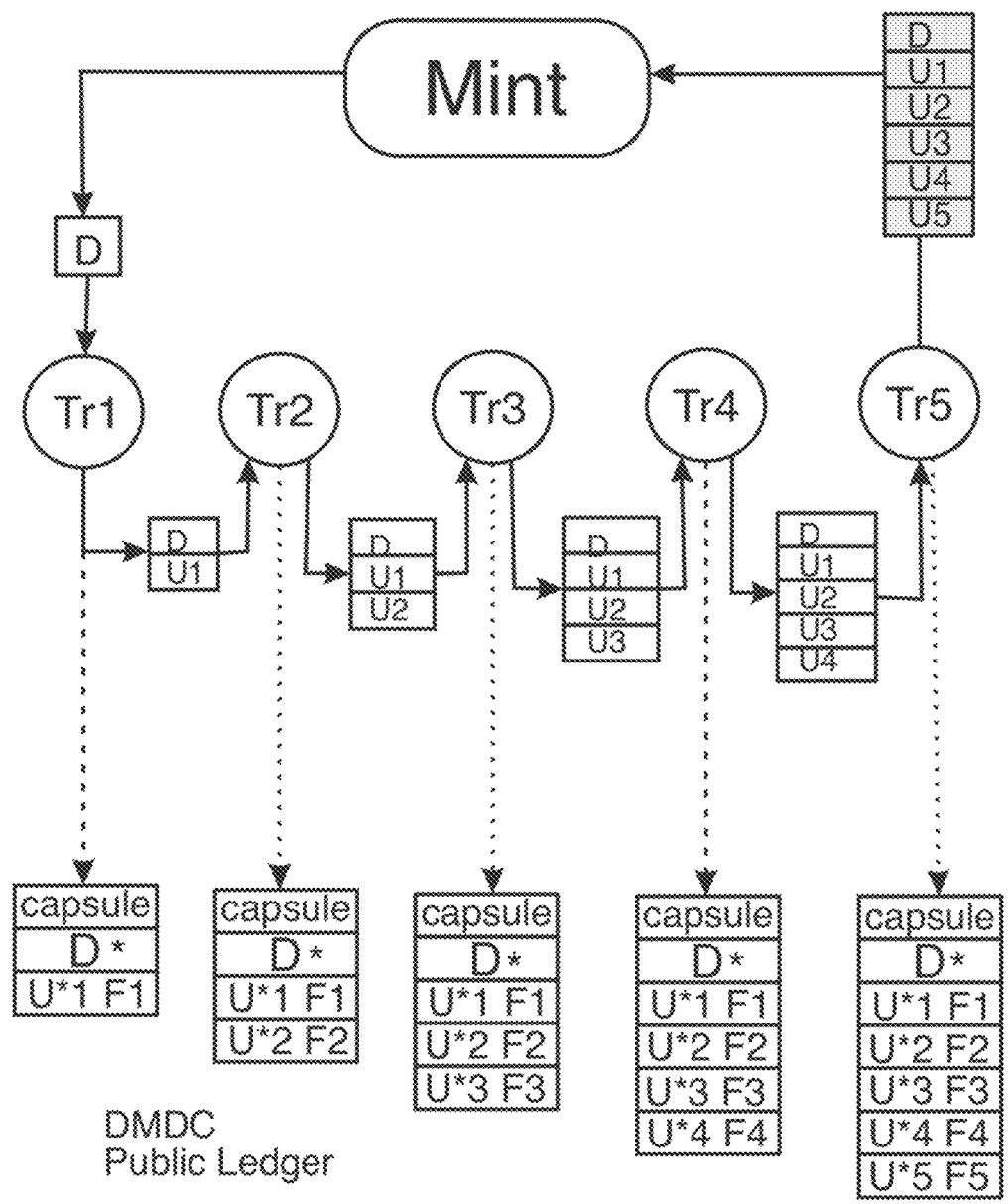

BITMINT*LEVEL: DECENTRALIZED MATHEMATICS DIGITAL COIN * QUANTUM SAFE, ROBUST ANONYMITY

Continuation in Part Of U.S. patent application Ser. No. 17/207,694 filed Mar. 21, 2021

This application is also a continuation in part of application Ser. No. 15/582,784 filed May 1, 2017. This application is also a continuation in part of U.S. patent application Ser. No. 14/352,994, filed on Apr. 18, 2014 as national stage application of PCT/US2012/061331, filed on Oct. 22, 2012, which claims the benefit of U.S. Provisional Patent Application Ser. No. 61/627,977, filed Oct. 22, 2011 and U.S. Provisional Patent Application No. 61/688,788, filed May 22, 2012.

This application is also a continuation-in-part of U.S. patent application Ser. No. 15/337,203, filed Oct. 28, 2016, which is a continuation of U.S. patent application Ser. No. 14/737,924, filed Jun. 12, 2015, which is a continuation of U.S. patent application Ser. No. 13/529,399, filed Jun. 21, 2012, which is a continuation of U.S. patent application Ser. No. 12/081,412, filed Apr. 15, 2008, now U.S. Pat. No. 8,229,859, which claims the benefit of U.S. Provisional Patent Application Ser. No. 60/960,672, filed Oct. 9, 2007 and U.S. Provisional Patent Application No. 60/907,869, filed Apr. 19, 2007, This application claims the benefit of U.S. Provisional Application 63/276,662 filed Nov. 8, 2021 all of which are incorporated by reference in their entireties.

BRIEF SUMMARY OF THE INVENTION

Digital currencies as a class rely on a well-defined mathematical complexity to generate pairs of public/private keys. This complexity may be (i) simplified with the power of advanced mathematical insight, and (ii) may be overcome with the power of new very fast computing machines (e.g. quantum). All such currencies will collapse when either way this underlying complexity yields to its attackers. Such catastrophic vulnerability points to a new foundation for digital currency, replacing the single public/private key formula (which the attackers focus on) selected by the currency protocol, with a set of surprise public/private keys formulas, selected individually by each coin holder. To cryptographically steal a coin in this decentralized mathematics currency the attacker will have to crack all the public/private keys formulas used by all the owners of the coin since it was minted. By choosing randomness-based public/private keys formulas from a large set of options the coin holders will be able to withstand any cryptanalytic attack on their money. This decentralized math digital currency, DMDC, is launched by a central mint which at most knows to whom the minted coin was paid, and who redeemed it. The central mint is clueless as to the identities of the in between traders. Their anonymity is ultimate both towards cryptography and towards the law. Albeit, by controlling the boundaries: minting and redemption, the mint strikes a favorable balance between law abiding anonymity and law breaking abuse. Such DMDC mints can be launched by any institution commanding public trust. A multitude of such mints will vie for public engagement, creating a decentralized mint environment where competitive pressures will alleviate the fear of a central abusive authority. This DMDC (BitMint*LeVel) protocol dovetails with the nominal BitMint protocol detailed in the continued application. LeVeL: Legacy extended Value entrusted Ledger

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Digital currencies as a class rely on a well-defined mathematical complexity to generate pairs of public/private keys. This complexity may be (i) simplified with the power of advanced mathematical insight, and (ii) may be overcome with the power of new very fast computing machines (e.g. quantum). All such currencies will collapse when either way this underlying complexity yields to its attackers. Such catastrophic vulnerability points to a new foundation for digital currency, replacing the single public/private key formula (which the attackers focus on) selected by the currency protocol, with a set of surprise public/private keys formulas, selected individually by each coin holder.

LeVeL: Legacy Extended Value Entrusted Ledger

Overview: Digital currencies as a class rely on a well-defined mathematical complexity to generate pairs of public/private keys. This complexity may be (i) simplified with the power of advanced mathematical insight, and (ii) may be overcome with the power of new very fast computing machines (e.g. quantum). All such currencies will collapse when either way this underlying complexity yields to its attackers. Such catastrophic vulnerability points to a new foundation for digital currency, replacing the single public/private key formula (which the attackers focus on) selected by the currency protocol, with a set of surprise public/private keys formulas, selected individually by each coin holder. To cryptographically steal a coin in this decentralized mathematics currency the attacker will have to crack all the public/private keys formulas used by all the owners of the coin since it was minted. By choosing randomness-based public/private keys formulas from a large set of options the coin holders will be able to withstand any cryptanalytic attack on their money. This decentralized math digital currency, DMDC, is launched by a central mint which at most knows to whom the minted coin was paid, and who redeemed it. The central mint is clueless as to the identities of the in between traders. Their anonymity is ultimate both towards cryptography and towards the law. Albeit, by controlling the boundaries: minting and redemption, the mint strikes a favorable balance between law abiding anonymity and law breaking abuse. Such DMDC mints can be launched by any institution commanding public trust. A multitude of such mints will vie for public engagement, creating a decentralized mint environment where competitive pressures will alleviate the fear of a central abusive authority. This DMDC (BitMint*LeVel) protocol dovetails with the nominal BitMint protocol detailed in the continued application.

BRIEF EXPLANATION OF DRAWINGS

FIG. 1: DMDC Schematics. The FIGURE shows the schematics of the Decentralized Math Digital Currency (DMDC) over 5 successive traders of a certain digital coin: Tr1, Tr2, Tr3, Tr4, and Tr5. The mint passes the digital definition (identity) of the minted coin to Tr1. Tr1 then picks a public/private key formula F1 and their ownership credentials, U1, then computes the shadow of U1: $U1^* = F1$ (U1), and adjusts the public ledger status of that coin to display $U1^*$, and F1. When Tr1 passes the coin to Tr2, they pass D and U1. Tr2 verifies the data given to them from Tr 1 with the ledger, and accepts the coin. Similarly each trader chooses their own ownership credentials, adjusts the ledger and passes the credentials to the next trader. Trader Tr5 decided to redeem the coin with the mint. To do so Tr5 submits to the mint the values of D, U1, U2, U3, U4, and U5.

INTRODUCTION

Momentum feeds on itself, carrying bitcoin into a dizzying ride, but the original impetus was and is fundamental: to own money, and spend money privately. Legacy banking eliminated the joy of anonymous cash spending, and bitcoin is seen as a way to reclaim this joy. Bitcoin trades smoothly across national borders, and escapes heavy handed monetary regulations. The price paid for the current assumed anonymity is value vacillation, looming risk of cryptographic collapse, and admission of a powerful enabler for the most hard core criminal element in society. Let us then come up with a digital coin that brings about the good parts of bitcoin and leaves behind the bad parts.

Enter LeVeL: Legacy Extended Value—Entrusted Ledger: a digital coin which is (1) value stable, (2) thoroughly decentralized, (3) trades frictionless, (4) regulatory obedient, (5) unfriendly to crime and abuse, (6) robustly private—anonymous.

The cardinal distinction between bitcoin and LeVeL is the matter of trust.

Bitcoin foundation of trust is the network of its traders at large. The community of traders wish trade to thrive, so this community should be trusted. Bitcoin is based on an algorithm that recruits the community of traders to establish a trust base on which to trade. Thereby it seems that no minority, no few people, will be able to assume control and subjugate the trading people. This idea has the charm that is beaming out of the notion of democracy—the solution of choice for governing people. So many are enchanted by it.

Democracy works as long as people trust the voting process: no fake votes are added, no double counting of votes, no dismissal of votes, etc. Alas, bitcoin suffers from fake votes, and breach-anticipated trading process.

The community of bitcoin traders is comprised of identity-unknown entities. One individual may manifest themselves through countless 'traders' magnifying their power beyond 'fairness'. In other words the community of bitcoin traders may silently be skewed towards a sub community of abusers. The greater the stakes—the higher the captalization of the coin—the greater the incentive for abuse. It is not sustainable.

Bitcoin is based on mathematical complexity which its builders believe to be robust enough against timely attack. But their belief is not a proof, it is an opinion. By now it is pretty clear that quantum computing will crush bitcoin. Beyond that bitcoin is based on the assumption that its hackers will not be smarter than expected. All in all bitcoin faces the risk of catastrophic collapse of its cryptographic foundation. What a poor foundation of trust.

The design of LeVeL looks for trust in places where trust has been built before. Society is replete with institutions that have been serving society for a long time, and are trusted in a limited but meaningful way. Most people deposit their monetary wealth in banks, trusting them. People buy insurance from companies they trust will be there if needed. People trust large corporations, government agencies etc. This trust is not a flare of the moment like bitcoin trust, but a long way coming.

The first design principle of LeVeL is that the LeVeL coin is minted by a trusted institution, and redeemed by that institution. This cycle of minting and redemption exploits the trust earned by the minting and redeeming institution, regardless of the ongoings of the LeVeL coin in between these two events.

If an institution of trust mints and redeems the LeVeL coin, how is that decentralized?

The LeVeL regimen is based on a community of trust bases, TB, where each trust base mints and redeems its own LeVeL coins. The LeVeL coin is based on decentralized trust spread among the existing well founded trust bases of society. Traders will readily shift from on LeVeL coin minted by $TB_i$ to another LeVeL coin minted by $TB_j$. When a certain trust base loses trust, the traders abandon it and move to other bases. The LeVeL coin concept is hinged on the combined decentralized trust claimed by trust bearing institutions in society at large. Big banks, big corporations, government agencies, etc., to the extent that they are trust worthy, are cohorts of trust in a decentralized mode. A more robust more sustainable trust than the bitcoin protocol idea.

Against the math complexity in the bitcoin protocol, comes now the LeVeL trade protocol based not on a specified (hackable) formula but on open-ended set of computational difficulties which cannot be universally hacked, since every coin presents a unique challenge (as opposed to bitcoin where hacking the ECC will dissolve the currency), and even this specific challenge can readily be increased to match any cryptanalytic assault. In other words the LeVeL cryptographic protocol is fundamentally trust worthy, while bitcoin is not.

Ahead we review: (i) a brief history of money, (ii) attributes of the LeVeL coin, (iii) LeVeL operational environment

A Brief History of Money

Money started as anything of value. After thousands of years the first coin was minted, identifying a precious material as the carrier of value. Then came the paper representation of money—banknotes. This was the case until the 2nd part of the 20th century when money became computerized. This mode is still the dominant mode today, called the Legacy mode. Its main element is the fact that money is bit-represented, but the bits only represent value, no coin identity. So much more can be done with money when it has not just value but also identity. Innovations in that directions were taken by David Chaum, Digicash, by BitMint, and then by Satoshi Nakamoto launching the crypto currency revolution. Digicash has a limited application while BitMint is part of a new financial language, it is the most efficient way to combine value and identity within a digital coin.

Neither Digicash, nor BitMint have captured the market and they were both eclipsed by a new and exciting notion of money, where trust is carved out from the community of traders at large, and law and order is maintained not by a political entity but by a universal algorithm, which purportedly provides anonymity to its money traders. The price of this network decentralization is untamable price vacillation, and having no power to intervene in case the currency goes haywire. The anonymity of crypto money traders opens the door for abuse, when a minority of players opens myriads of accounts and experts influence beyond its proportion, exactly the kind of ill influence bitcoin was designed to resolve.

The price of shifting authority from a political entity to an algorithm is that the money system as a whole is vulnerable to smarter mathematicians and faster computers, and its de facto implementation is in the hands of back room programmers with unaccountable agenda.

Nonetheless the crypto craze exhibits the innate desire to trade anonymously, as a deep seated element of well being.

BitMint*LeVeL is a money concept designed to extract from bitcoin its good parts and do away with the bad parts. LeVeL takes up the foundational financial language in BitMint per se, and implements it through a network of currency mints; thereby shifting the notion of decentralization from having no central mint to having a community of parallel mints. This solution idea maintains the advantages of a central mint—the ability to fast and resolutely intervene to solve acutely arising problems, the ability to maintain the value of the coin by a set purchase price and a set redemption price. Yet, the multitude of competing mints will offer an alternative to the central bank as a sole overpowering force in trade and money matters. The central bank will take control from bird's eye view, allowing and regulating the multitude of mints to compete and improve.

The LeVeL solution also took some good ideas from bitcoin: the idea of a public ledger. As it stands today LeVeL can be seen as an extension of the classic BitMint protocol to a protocol that allows traders to exchange the BitMint coins with robust anonymity. The mint is blind as to the identity of the traders of its coins, but by keeping the control on the minting and redemption process, the mint retains the power to intervene in emergency situations, and to offer countermeasures to fraud and abuse.

The Essentials of LeVeL Trade Dynamics

LeVeL works exactly as BitMint (described in the continued applications Ser. Nos. 17/207,694, 15/582,784) with two major distinctions: the coin configuration, and the trading protocol. Namely the BitMint minting process is maintained; the coin image database is maintained, the idea of mint control of the minting and the redemption process is maintained. The idea that the BitMint coins are claim checks against a backup entity of value, most commonly a fiat currency are fully in force. BitMint envisions a collection of mints—an InterMint, so does LeVeL.

The LeVeL system, like BitMint regular, identifies a first trader (the trader who buys, receives the digital coin from the mint), and a last trader—the redeemer who redeems the BitMint LeVeL digital coin against the item of value that backs it up. The difference between the LeVeL system and the regular, nominal BitMint system is in the process of trading the digital coin between the first and the last trader. The challenge in both cases is two folds: counterfeit coins, and double spending. Nominal BitMint handles this challenge through either per transaction authentication, or per payor authentication through trust management. In both modes the mint can breach the anonymity of the traders. In the LeVeL protocol the in-between traders maintain their anonymity vis a vis each other, vis a vis the public at large, vis a vis the mint. The LeVeL anonymity is controlled by the traders. In that respect this is like cash operation, but with one clear distinction. The LeVeL coins, at the end of the day, are redeemable at the mint. If a coin falls under suspicion, its redemption can be held back, refused, frozen, etc. So while the LeVeL coin trader keeps his robust anonymity, the mint can flush out wrong doing by exercising its power over the coin itself. Nominally though, like cash, the BitMint LeVeL coins are traded with effective secrecy and privacy. This strong privacy is based on a novel idea: traders' controlled privacy. The LeVeL mint can set an expiry term on its coins, and any other terms, but it is totally blind as to the whereabout and the service of the LeVeL coin, the movement, the purchases, the giving, the passing—any dynamics that transpires between the first trader—the coin purchaser from the mint, and the last trader—the redeemer. This in-between blindness is the unique feature of the LeVeL coin over the nominal BitMint trade.

Ahead we discuss (i) the unique LeVeL technology feature: trader's controlled trust, and (ii) The LeVeL trader sequence.

Traders' Controlled Trust

The nominal BitMint trader trusts the mint to carry, manage well its trading environment, and to respect the traders' anonymity. Alas, at will the mint can violate this anonymity, surely with a court order, unless the payee risks being defrauded by the payor. In the LeVeL environment the trader safeguards his or her privacy by choosing himself or herself the protective algorithm. If that algorithm is cracked, then identity is not revealed but the coin may be stolen. This idea that a trader determines the cryptographic wall around his or her coin is very consequential. We address three features: (i) no universal breach, (ii) self reliance, (iii) adapting security to coin value.

No universal breach: the security of digital currency is normally hitched on a single mathematical formula which is assumed intractable for assailants, and so providing the necessary security. A breach of this single formula will be catastrophic for this digital money system. LeVeL security is based on individual mathematical algorithms, each selected by a trader, so that there is no universal formula to crack and kill the currency. The attacker at most, may breach the security of one or more traders, and steal a single coin at a time.

Self Reliance: the trader is the entity that picks the protective mathematics, so that if cracked there is no one to blame except one self's.

The trader can therefore adapt the level of security to the value of the protected coin, project more protective math for high valued digital coins.

The LeVel Trader's Sequence

A first LeVeL trader will approach the LeVeL*BitMint with a request to be given a LeVeL coin denominated for value x. This first trader will pass to the coin the amount $x+\Delta x$, where $\Delta x$ is a service sum exacted by the BitMint mint for offering the LeVeL trading service. Since the environment is replete with competing mints, the value of $\Delta x$ will be regulated by competitive pressures.

In order to begin the LeVeL trade, the first trader will need to select her owner certificate, "OC", then compute the 'shadow' of the OC (Sh(OC)). A shadow is a mathematical entity extract from another mathematical entity called the 'shadow caster'. The computation OC to its shadow is easy and straight forward, but the reverse is intractable $$OC \to [easy] \to Sh(OC)$$

$$Sh(OC) \to [hard] \to OC$$

In response to the first trader request the BitMint mint will mint a coin, identified as coin X, denominated at value x, and keep a copy of the minted coin, X, in its coin database. Then the mint will do the following:

1. Announce the new coin on the LeVeL public ledger maintained by the mint, by posting a record, $L_x$. $L_x$ is constructed as a regular BitMint coin. It does not present the coin payload. The mint will compute a shadow of the coin payload: $Sh(X_{payload})$, and post it on the ledger as what it is.

2. Receive from the coin buyer ($Tr_1$) the 'shadow' of their selected Owner Certificate, (owner credentials) $OC_1$, for the mint to post it as part of the coin entry in the public LeVeL ledger. (Alternatively, $Tr_1$ will prepare the record for posting).

3. Pass to the the first trader ($Tr_1$) the 'payload' of the coin ($X_{payload}$), as defined in the continued application. The coin payload is also regarded as the coin definition, D. The mint may insist on checking the identity of the first trader, or it may leave that identity obscured. This may depend on the prevailing regulations, and on the value of the coin, $|X|=x$.

This establishes $Tr_1$ as the acknowledged owner of coin X (It happens at the purchase time $t_0$).

The first trader ($Tr_1$) may choose, at time point $t_1 > t_0$ to pass the coin to the 2nd trader, ($Tr_2$).

To do that $Tr_1$ will pass to $Tr2$:
1. the coin payload, $X_{payload}$
2. their owner certificate, $OC_1$ The second trader, $Tr_2$ will authenticate $Tr_1$ as the valid owner of coin X. This authentication will be done without having to expose the identity of $Tr_1$. This feature of the LeVeL protocol is the essential cash-like feature of the LeVeL currency. The cash payee does not need to know who the payor is, the payment is authenticated on the credentials of the passed around cash. With LeVeL, the transaction is validated by a mathematical exercise that the unknown $Tr_1$ is the valid owner of the transacted coin X.

$Tr_2$ will use the coin payload submitted by $Tr_1$, $X'_{payload}$, and the owner certificate, $OC_1$ and:

1. Compute the shadow of the payload received from $Tr_1$: $Sh(X'_{payload})$
2. Compute the shadow of the owner certificate submitted by $Tr_1$: $Sh(OC_1)$
3. Compare the computed shadow, $Sh(X'_{payload})$, with the coin shadow posted on the ledger, $X_{payload} = L(X_{payload})$
4. Compare the computed shadow of the owner certificate submitted by $Tr_1$, $Sh(OC_1)$ to the shadow of $Tr_1$ as posted on the ledger, $L(OC_1)$: $Sh(OC_1) = L_x(OC_1)$ If the two comparisons in steps 3 and 4 above check out, then $Tr_2$ is satisfied that the payor who submitted the coin payload and the owner certificate are the bona fide payor, and then $Tr_2$ acknowledges the payment of the sum x from $Tr_1$.

Right away $Tr_2$ will do:
1. Select his own owner certificate $OC_2$,
2. Compute the shadow of his owner certificate: $Sh(OC_2)$
3. Post on the LeVeL public ledger a additional entry for coin X, to wit: at time point $t_1$ the ownwership of coin X was switched from the first trader, $Tr_1$ to the second trader $Tr_2$, identified by the shadow of his owner certificate, $Sh(OC_2)$.

The public LeVeL ledger for coin X will now feature the original posting by the mint, including the shadow of the coin payload, the time $Tr_1$ assumed control of coin X, to, the shadow of the first owner certificate, $Sh(OC_1)$, and the updated status that at time point $t_1$ $Tr_1$ passed the coin to $Tr_2$, who is identified by the shadow of his coin certificate ($Sh(OC_2)$).

The ledger entry for coin X now looks like this:
[coin capsule] [coin payload shadow] [$t_0$] [1st owner: $Sh(OC_1)$] [$t_1$][2nd owner: $Sh(OC_2)$]

At time point $t_2$ the 2nd owner of coin X will wish to pass the coin to the its third owner, $Tr_3$.

To do so $Tr_2$ will pass to $Tr_3$ the coin payload, $X_{payload}$, the owner certificate of $Tr_1$, $OC_1$, and his own owner certificate $OC_2$.

The 3rd trader, $Tr_3$ will now authenticate $Tr_2$ as the valid owner of coin X. This authentication will be done without having to expose the identity of $Tr_2$.

$Tr_3$ will use the coin payload submitted by $Tr_2$, $X''_{payload}$, the owner certificate, $OC_2$ plus the owner certificate of the first trader, $OC_1$, and then:

1. Compute the shadow of the payload received from $Tr_2$: $Sh(X''_{payload})$
2. Compute the shadow of the owner certificate submitted by $Tr_2$: $Sh(OC_2)$
3. Compute the shadow of the owner certificate submitted by $Tr_1$: $Sh(OC_1)$
3. Compare the computed shadow, $Sh(X''_{payload})$, with the coin shadow posted on the ledger, $X_{payload} = L(X_{payload})$
4. Compare the computed shadow of the owner certificates submitted by $Tr_2$, $Sh(OC_2)$ to the shadow of $Tr_2$ as posted on the ledger, $L(OC_2)$: $Sh(OC_2) = L_x(Sh(OC_2))$
5. Compare the computed shadow of the owner certificates submitted by $Tr_1$, $Sh(OC_1)$ to the shadow of $Tr_1$ as posted on the ledger, $L(Sh(OC_1))$: $Sh(OC_1) = L_x(Sh(OC_1))$.

If the three comparisons in steps 3, 4 and 5 above check out, then $Tr_3$ is satisfied that the payor who submitted the coin payload and the owner certificate are the bona fide payor, and then $Tr_3$ acknowledges the payment of the sum X from $Tr_2$.

If any of these comparison fails, the payment attempt is rejected.

Right away $Tr_3$ will do:
1. Select his own owner certificate $OC_3$,
2. Compute the shadow of his owner certificate: $Sh(OC_3)$
3. Post on the LeVeL public ledger an additional entry for coin X, to wit: at time point $t_2$ the ownwership of coin X was switched from the 2nd trader, $Tr_2$ to the third trader $Tr_3$, identified by the shadow of their owner certificate, $Sh(OC_3)$.

The public LeVeL ledger for coin X will now feature the original posting by the mint, including the shadow of the coin payload, the time $Tr_1$ assumed control of coin X, to, the shadow of the first owner certificate, $Sh(OC_1)$, the shadow of the 2nd owner certificate, and the updated status that at time point $t_2$ $Tr_2$ passed the coin to $Tr_3$, who is identified by the shadow of their coin certificate ($Sh(OC_3)$).

The ledger entry for coin X now looks like this:
[coin capsule] [coin payload shadow] [$t_0$]
[1st owner: $Sh(OC_1)$] [$t_1$][2nd owner: $Sh(OC_2)$][$t_2$][3rd owner: $Sh(OC_3)$]

This sequence continue much the same for traders $Tr_1$, $Tr_2$, $Tr_i$ . . . indefinitely. Payment of coin X constitutes passing the coin payload and the owner certificates of all the previous owners of this coin. Note that all the owners are identified only with their owner certificate, no information about their ID. No one knows the identity of the traders, not the previous traders, not the subsequent traders, neither does the mint know who those traders are.

When trader number-i, $Tr_i$, wishes to pass the coin to trader number (i+1), $Tr_{i+1}$, the public ledger for coin X looks like:
[coin capsule] [coin payload shadow] [$t_0$]
[1st owner: $Sh(OC_1)$] [$t_1$][2nd owner: $Sh(OC_2)$][$t_2$] [i-th owner: $Sh(OC_i)$][$t_i$]

$Tr_i$ passes to trader $Tr_{i+1}$ the following:

$$X_{payload}, OC_1, OC_2, \ldots, OC_i$$

Trader (i+1), $Tr_{i+1}$ will check the bona fide status of the (i+1) numbers given to it by trader $Tr_i$, by computing their shadows and comparing the shadows to the data on the LeVeL public ledger. If all comparisons check out, then trader $Tr_{i+1}$ concludes that $Tr_i$ is the rightful current owner of the coin at present, and accepts the payment, shifting control from trader-i to trader-(i+1).

Eventually the coin is passed to the redeemer trader, $Tr_r$, which approaches the mint, requesting to be paid the quantity x in exchange for submitting the coin X (a claim check for coin X of value x). Trader $Tr_r$ will submit to the mint:

$$X_{payload}, OC_1, OC_2, \ldots OC_r$$

The mint will check $Tr_r$ submissions against the public ledger for coin X and if all checks out, then the mint will check the coin image database for coin X, and if the coin was not previously paid out, then trader r will receive into their disposal the backup currency x. As indicated the mint will keep an image of each minted coin in the special coin image database.

Cryptographic Foundation

The LeVeL digital coin is constituted on a robust cryptographic foundation with a unique and novel feature "distributed mathematics digital coin" (DMDC). Nominal digital currencies rely on a well defined mathematical intractability operation (MIO), Their viability is based on the assumption the MIO will hold. Specifically a nominal digital currency relies on the expectation that (i) no attacker will discover hidden mathematical insight with which to crack the MIO), and (ii) no attacker will be able to attack the MIO with sufficient computational power to compromise the digital currency in a timely manner.

The worrisome aspect of every such digital currency is that any of these two expectations will not hold. While it would have been nice to secure a proof for the robustness of these tow expectations, such proof is not even theoretically possible. For a private or limited digital currency, this risk is private or limited. But for the public at large, or national digital currency such risk is unacceptable.

This reasoning leads to charting an innovation objective defined as overcoming the risk of digital currency collapse.

This application is a result of taking on this innovation objective (IO), turning it into an innovation challenge in focus (ICIF), and meeting this challenge by applying the principles of the Innovation$^{SP}$. (see reference: "The Innovation Solution Protocol" (Innovatio$^{SP}$), https://Innovation-SP.net).

Applying the abstraction step in the Innovation$^{SP}$ the described risk is redefined as having a single well defined mathematical intractability formula that underlies the product, in this case a digital currency. To escape the articulated risk one will seek to move away from the 'single' limitations. A single intractability 'lock', so to speak, is breakable, but a chain of two different locks is much less breakable because the attacker will have to negotiate two intractability hurdles. This will make it more difficult for the attacker quantitatively but not qualitatively. Same for constructing a chain from some n math hurdles. As long as these math intractability hurdles are well defined, and known in advance, the attacker will compromise them one by one. At this abstraction level, the way to prevent the attacker from compromising the hurdles is to use surprise hurdles. Namely a hurdle not known to the attacker before it is deployed. Come to think about it, all digital currencies are based on a well articulated mathematical foundation giving the attacker plenty of time to work out an attack strategy and line up dedicated computational power. By putting forth a surprise hurdle, this advantage is removed. The attacker will have to plan his attack no sooner than he knows what to attack. In principle the user, the defender, could deploy surprise attacks at sufficiently high pace, so that as the attacker gets closer to crack a certain hurdle, a new hurdle pops up, and the attacker works starts from the beginning, since the new hurdle is as much a surprise as the former one. And so on, as long as it is needed to prevent a breach, new hurdles will pop up and keep the integrity of the defended asset.

That is the abstract solution: a stream of surprise hurdles will keep the integrity of the defended assets. The flow rate of this stream and the intrackabilities of the surprise hurdles should be set high enough to frustrate the attacker.

Returning from the abstraction to the original challenge, we face with the requirement to create a flow of intractability challenges for the attacker of the coin. Come to think about it, the consumer of the cryptanalytic intractability is the coin holder, why not shift the responsibility to offer this intractability to its consumer.

To figure out how to set it up, we take a look at the prevailing crypto currencies, in an abstracted view (Innovation$^{SP}$).

A crypto currency changes hands through traders that identify themselves with a public key, and prove their identity with the corresponding private key. The transactional history of a coin is maintained in public view, further creating a hurdle for fraud and abuse. The weakness of the crypto currencies is in the fact that all the public/private key instances rely on a single mathematical formula which we have seen is vulnerable to further mathematical insight and to faster computers. Traders of crypto currencies like bitcoin, choose their own data, but abide by the single intractability formula associated with that coin. This single-formula vulnerability we now seek to resolve, and do so by requiring the traders to surprise everyone with their own intractability formula.

This seems quite daunting because there are only a handful of known public/private keys setup, in the known configuration where one key encrypts and the other key decrypts. Therefore, in order for the traders-introduced intractability to be a surprise we need to abandon this requirement to correspondingly encrypt and decrypt with the public and private keys. Once we get rid of this requirement, we face a myriad of mathematical formula where a mathematical entity A easily computes to mathematical entity B, while the reverse is intractable:

$$A \to [easy] \to B$$

$$B \to [hard] \to A$$

A trader will then present themself to the public with mathematical entity B, and prove their identity with the secret math entity A. Let F be the formula to compute the entities one from each other: $A=F\hat{}(B)$, $B=F(A)$. where $F\hat{}$ is the reverse function for F. So each trader $Tr_i$ will present themselves through the public mathematical entity $B_i$, and intractability formula $F_i$. The challenge to the attacker will be to compute $A_i=F\hat{}_i(B_i)$.

Like in crypto currencies we will seek to set the trade such that an attacker will have to compromise the entire trading history of the coin:

$$[\text{Coin Trading History}]=\{B_1,F_1\},\{B_2,F_2\} \ldots \{B_i,F_i\}$$

This creates the desired flow of intractability challenges. Each challenge will be a complete surprise to the attacker.

We may envision now trader $Tr_1$ holding a particular coin, claiming its ownership via a public statement that identifies the coin, identifies the trader, as $Tr_1$, and then claiming their proof of rightful possession by a public $B_1$ (mathematical entity), over the publicly known intractability formula $F_1$.

Let's assume that some Trust Base has signed off on this statement, saying what trader 1 is saying is correct:

[Public Statement regarding coin $X$]=[coin-id:$X$]
 [value:$x=\lfloor X \rfloor$][owner:$Tr_1$][intractability formula:
 $F_1$][public key:$B_1$]

Trader 1, engaged in a cyber conversation will be able to prove to a prospective payee, $Tr_2$ their identity as $Tr_1$, by passing to $Tr_2$ the mathematical entity: $A_1$. The payee, $Tr_2$ will readily verify that $A_1$ is the private key corresponding to $B_1$, since $A_i \rightarrow$[easy]$\rightarrow B_i$.

At this very instance the payee is in equal state to the payor with respect to their ability to claim ownership of coin X. Once $Tr_1$ shared $A_1$ with $Tr_2$, they both can claim vis a vis a third trader, $Tr_3$ that they are the rightful owner of coin X.

In the next instance $Tr_2$ will add a status line to the public record of coin X to state:

[State of coin $X$]=[coin-id:$X$][value:$x=\lfloor X \rfloor$][old
 owner:$Tr_1$][intractability formula:$F_1$][public key:
 $B_1$][new owner:$Tr_2$][intractability formula:$F_2$]
 [public key$B_2$].

This revised public picture for coin X, removes $Tr_1$ from ownership, and instates $Tr_2$ as the current owner. This process may continue indefinitely to traders $Tr_3$, $Tr_4$, . . . .

As described this configuration is extremely vulnerable to fraud, Fraudster Fr will claim to be trader $Tr_{i+1}$, and write his math entity B(Fr) and his intractability formula F(Fr). Trader $Tr_{i+2}$ will not be able to distinguish trader Fr as a fraudster. This vulnerability will be readily cured by requiring the current owner of a coin to submit to his payee (the next trader), all the former private keys, the A values of all the traders till the current: $A_1, A_2, \ldots, A_{i+1}$.

This uninterrupted chain of private keys will prove to the next trader that his payor is the rightful owner of the coin and hence the one with the right to use it as payment. This add-on will prevent fraudster Fr from cheating trader (i+2). The fraudster will have only the owner certificate they fraudulently concocted for themselves. The fraudster will not be in possession of all the owners certificate, or say owner's credentials of the full list of previous owner. Only the rightful current coin owner will be in possession of this list. So by adjusting the LeVeL protocol to require a payor to submit all the ownership credentials of previous owners and also the coin definition (payload), this fraud avenue is blocked.

We have described here a working safe sequence of payment for a given digital coin which is based on two important premises from crypto currencies: the public/private key, and the public ledger. Albeit, this solution resolves the inherent vulnerability of crypto currencies, their reliance on a well known formula that attackers have ample time to work on their cryptanalysis. This so called decentralized-math solution (decentralized math digital coin DMDC) creates a flow of surprises against the attacker of the system.

This flow of intractability surprises supports a sequence of payments from one trader to the next. Each trader is responsible for his and her intractability challenge. This DMDC exhibits a transfer of trust mechanism from a payor to a payee, from trader $Tr_i$ to trader $Tr_{i+1}$. The public-ledger accompanied procedure defends against double spending. The danger of counterfeit is handled via the start-off trust. The coin claimed by Trader 1 must be trusted. Trader 1 receives the minted coin from a public trust base, like a bank. Then the trust migrates from one trader to the next. A host of procedural issues needs to be addressed, to build this procedure into a basis of a digital currency, but the kernel is herewith established, The coin follows the chain of private keys from the first trader to the current one. This 'chain' prevents double spending, and trust embued on trader one prevents counterfeiting. Security has been taken off the responsibility of the organizer of this payment procedure and is shifted to the hands of each trader in turn, where security is built up as the chain grows. Security is based on the foundational idea of surprise challenges appearing at a rate that is adjusted to meet the attacker's ability to defeat it. This rate can be adjusted. Should an attacker be successful with a few coins, then the rate will increase until theft and compromise is prevented. Rate can be readily increased by one trader passing the coin to themselves. That is trader $Tr_i$ also assumes the identity of the next trader, $Tr_{i+1}$, and trader (i+2) and on, if necessary. Such self passing, if necessary, does not detract anything financially from anyone, it simply increases at will the security defense.

This robust security is the cardinal advantage of DMDC over the common single-intractability formula crypto currency. DMDC will withstand quantum cryptanalysis and any attack by smarter mathematicians, simply through the power to increase security to such level that it does not yield to attackers.

DMDC through its operation keeps the identity of the traders behind this robust wall of security. DMDC is managed by a management authority but that authority is clueless as to the identity of the traders. Like crypto currency, possession of mathematical entity is the proof of ownership of a coin, nothing beyond that. Traders could give themselves any imagined name in the field where they describe their name, as $Tr_i$, this name has nothing to do with the payment procedure.

To further establish DMDC as a viable payment solution we need to address: (i) DMDC management: trust, responsibilities, operation, (ii) the DMDC public/private key, (iii) setting up the DMDC public ledger.

DMDC Management

Bitcoin and similar currencies are managed through a majority of traders choosing to adhere to the declared protocol of the currency. This leads to many of the weaknesses of the coin. The DMDC by contrast is managed by the mint that both mints and redeems the digital currency coins. The mint issues the rules of the currency, and is the address to go to on any complaints regarding the currency.

The trade of the digital currency is based on the trust of the traders in the mint that would redeem its coins per their denominated value. There is no mining process, no proof of work, or proof of stake. Every payee tacitly expresses their trust in the readiness of the mint to redeem its coins.

The mint will not know where the digital coin is at any moment prior to its redemption and beyond the first trader, but it maintains control of the trade with its ability to refuse redemption of a given coin. Once such refusal is publicized the coin will stop trading.

The DMDC is run on the continuous wide spread exposure of the DMDC public ledger. This ledger is run by the mint. The mint updates information on the ledger, and traders add their claim of ownership to the ledger. It is an operational requirement for the ledger to be continuously exposed to the full base of the traders community.

One thing the mint does not do is to dictate to the traders the public/private key formula they should use. Each trader chooses their own public/private key formula, and is responsible for its efficacy. If it would take too long to verify that a private key submitted by the payor corresponds to the public key published on the ledger, then payees will opt out. If it turns out too easy to deduce a valid private key from the ledger written public key—then the coin will be stolen from its rightful owner. But these risks do match ordinary risks today by holding money in one's wallet. When a bank customer takes cash out of his account, the bank is no longer responsible for the money.

Cryptographically speaking the trading sequence responsibility is shared by the traders, to each his own, his or her choice of formula and data to carry out the public/private key effect. The mint will only redeem coins that comply with the requirements to present the full chain of owners credentials.

DMDC Public/Private Keys

The heart of the DMDC (LeVeL) system is the surprise use of one-way functions that allow for a quick and easy way to compute a public key from a private key, but poses a measurable hurdle that can be made big enough on the reverse computation from the public key to the private key.

For DMDC to operate there must be a large stock of public/private keys formulas to choose from, and a variety of data items to choose from. These formulas will be able to be chosen with at will efficacy to deny attackers their aim to defeat the onewayness of the formula.

Public/Private key cryptography was invented in the 70s of the last century and it revolutionized cryptography, public administration and the economy. Its tenants may be readily used for DMDC purposes. Given two prime numbers P and Q as private key, then their multiplication PQ may be regarded as the public key, based on the lack of published algorithm to efficiently extract P and Q from PQ. In that case it will be the responsibility of the trader to choose large enough P and Q to ensure the security of their ownership credentials.

The elliptic curve formula is another, even stronger formula; lattice mathematics is yet another. There are not too many, but each can be used.

The advent of quantum computers undermines the prevailing trust in these mathematical complexity type of one-way formulas. One then may opt for randomness, or pattern-devoid options where there is no fear of an attacker using mathematical insight not known to the formula user. We discuss such randomness based solutions.

It is noteworthy that a DMDC (LeVeL) trader may use several one-way formulas in combination such that an attacker will have to breach each and every one of those formulas in order to successfully steal the coin. This combination plus the free choice to select formulas which are as hard to compromise as desired, and to do so by surprise, different choices for each coin, and for each coin different choices by each trader—it all tips the scale in favor of the DMDC user and against the DMDC abuser. This freedom to build a security wall through open ended one-wayness makes DMDC quantum safe, and safe against smarter hackers. In case that some coins are stolen nonetheless, then the users will keep erecting a larger and larger security wall until their money is secure.

Randomness Based One-Way Formulas

Randomness based one way formulas, or pattern-devoid solutions compel their attacker to use brute force. Brute force effort can be credibly appraised based on a realistic appraisal of the computation power of the attacker.

We discuss:
1. hashing 2. transposition class 3. Unbound Space class

Hashing

A long bit string L may be 'hashed' to a short string S, using a key K with a formula F:

$$S=F(L,K)$$

Given S, K, and F it may be hard to reverse compute L. The more L is larger than S, the more difficult it is to identify L. There are well known hashing functions that are well distributed so that the probability for an arbitrary L' to fit, namely:

$$S=F(L',K)$$

is $2^{s-l}$, where s and l are the bit count of S and L respectively. This probability for a well defined hashing function determines the difficulty to reverse compute S to a qualified L.

Hashing can be made much more difficult by using it over some n keys: $K_1, K_2, \ldots K_n$ The attacker will be required to find a pre-hash value L such that:

$$S_i=F(K_i,L) \text{ for } i=1,2,\ldots n$$

In that case the hacker will be presented with $S_1, S_2, \ldots S_n$, and $K_1, K_2, \ldots K_n$, and will be required to find a number L to fit all these requirements. The probability for an arbitrary number L' to qualify as L is:

$$\pi(2^{s_i-l_i}) \ldots \text{ for } i=1,2,\ldots n$$

which can me made as high as $2^{-l}$, namely there will be only one number L so qualified, and since L can be made as large as desired, the user can fully control the cryptanalytic burden to reverse compute the public key to the private key.

Intractability hurdles may be further nourished by choosing a variety of m hashing formulas, $F_1, F_2, \ldots F_m$, and using them randomly over the n hashing tasks.

Transposition

Regarding the complete transposition method, detailed in in "Equivoe-T: Transposition Equivocation Cryptography." "Equivoe-T: Transposition Equivocation Cryptography." Gideon Samid, International Association of Cryptology Research, ePrint Archive https://eprint.iacr.org/2015/510, and in "The Ultimate Transposition Cipher (UTC)." "The Ultimate Transposition Cipher (UTC)." Gideon Samid, https://eprint.iacr.org/2015/1033.pdf, and in "Equivoe-T: Transposition Equivocation Cryptography" U.S. Pat. No. 10,608,814.

Given a bit string L, an integer K, one will apply the complete transposition formula, F, to compute a transposed L: $L^T=F(L, K)$.

Given L, K it is easy to compute $L^T$, given $L^T$ and K it is easy to compute L. However, given L, and $L^T$ it is hard to compute K. Accordingly K will qualify as a private key over L, $L^T$, and F as a public key.

Here too cryptanalytic intractability may be increased at will building the public key as n pairs of $L_i, L^T_i$ for i=1, 2, . . . n, with the corresponding private keys as the list $K_1, K_2, \ldots K_n$, given that for i=1, 2, . . . n we have $L^T_i = F(L_i, K_i)$.

Transposition may be combined with hashing to more effective public/private keys capabilities.

Transposition+Hashing

Let the private key be a bit string L larger than a threshold θ. |L|≥θ. Let L be transposed with a key K, using the complete transposition algorithm, Ft, to $L^T$: $L^T$=Ft(L, K). Let H be the hash of $L^T$: H=Hash($L^T$), where Hash is a standard hashing algorithm generating a hash of size h<θ bits. In that case H and K will be the public key. One would randomly select L of sufficient size, |L|>θ, and randomly select an integer K, to compute $L^T$ and hash it to H. Alas, given H, and K it would be hard to find a qualified L.

One would repeat the same procedure over the same L with keys $K_1$, $K_2$, ... $K_n$, resulting in n hash values: $H_1$, $H_2$, ... $H_n$. The n pairs $\{H_i, K_i\}$ for i=1, 2, ... n will serve as the public key. The larger n, the more difficult is it to find a qualified L that will satisfy the n conditions. The randomized nature of the data will prevent a clever mathematical shortcut, only brute force is applicable. The brute force approach will have to start from a selected candidate L where |L|=θ, and then increment L again and again until the right L is found.

Unbound Space

This method is based on methods outlined in "SpaceFlip: Unbound Geometry Cryptography" ["SpaceFlip: Unbound Geometry Cryptography." Gideon Samid, https://eprint.iacr.org/2019/285.pdf, "SpaceFlip:UnboundGeometryCryptography" GideonSamid https://dblp.org/rec/journals/iacr/Samid19.html], "SpaceFlip: Unbound Geometry Security" U.S. Pat. No. 10,790,977.]

An unbound space is a space Ω, comprising n points where the distances between any two points, $p_i$, $p_j$ i,j=1, 2, ... n is completely randomized. Let M be an ordered list of μ points in Ω. Let Q be an unordered set of q points in Ω.

We define a 'shadow' S of M on Q as follows:

Let the first point in M, $m_1$, point to point $q_1$ in Q where $q_1$ is the point in Q that has the shortest distance to $m_1$. How to resolve a situation where there is more than a single shortest distance is explained in detail in the referenced sources. Let the 2nd point in M, $m_2$ point to $q_2$ in Q where $q_2$ is the point that has the shortest distance to $m_2$, among all points in Q, with $q_1$, excluded.

Similarly point $m_i$ for i=1, 2, ... μ in M will point to point $q_i$ in Q, where $q_i$ is selected among all the points in Q minus $q_1, q_2, \ldots q_{i-1}$.

If m>q then points $m_{q+1}, m_{q+2}, \ldots m_\mu$ will be passed on and ignored. In that case the so constructed shadow of M on Q appears as a particular permutation of the q points in Q. If m<q then the shadow is permutation of a subset of the points in Q.

We so defined the shadow S cast by M on Q. Given M and Q, it is easy to identify the shadow S. However given the shadow S and the "shadow canvass" Q, it is hard to find M, especially if the size of M, μ is not known.

Given M one can select n 'shadow canvases' $Q_1$, $Q_2$, ... $Q_n$, and compute for all of them the shadows $S_1$, $S_2$, ... $S_n$, where $$S_i = F_{shadow}(M, Q_i)$$

where $F_{shadow}$ is the above described shadow casting formula.

The computation of the n shadows is straight forward. Alas, given the n shadows $S_1, S_2, \ldots S_n$ and the corresponding n shadow canvasses: $Q_1, Q_2, \ldots Q_n$, it is intractable to reverse compute M, or any other subspace of space Ω that will qualify over the n requirements.

Note that if $\mu \geq |Q_{max}|$ then M is of unknown size, and the attacker will have to start with various $\mu = |Q_{max}|$ and increment the tried value of μ until M is found. Namely when the size of M is larger than the size (point count) of the largest shadow canvass then the size of M is part of the unknown.

Because all the distances among the points in Ω are randomly assigned, it is not possible to exploit any pattern and exercise a shortcut. The attacker will be compelled to use brute force attack, which is credibly appraisable.

DMDC Public Ledger

A state updated database is a common undertaking in computer science, and any of the working methods can be used for the purpose of building the ledger. Alas because this ledger manages money special attention is called for.

It is of advantage to build the ledger as a non-erasable accumullation of records. This can be done through a succession (cascade) of cryptogrphic signatures of the accmulated past. Updates of states of ownership come forth as additional records, which in time are cyrptographically signed too.

To achieve maximum accessibility copies of the ledger may be sent over special channels to distribution centers.

According to one implementation the official ledger will be accompanied by a tentative ledger that is periodically validated by the mint and used to update the official version.

Coins leave the ledger to a corresponding archive only when they have been redeemed in full.

DMDC Coin Image Database

The DMDC coin image is the nerve center of the operation. It is the basis of the redemption process. Its integrity must be kept in high priority. The coin image include the coin definition, the payload, which is fully randomized. For safety this randomization should be extracted from a hard rock, the rock of randomness, according to the methodologies described in "Rock of Randomness" U.S. Pat. No. 10,467,522, and in "The Rock of Randomness: A physical oracle for securing data off the digital grid" and in "TheRockofRandomness:Aphysicaloracleforsecuringdata-offthedigitalgrid":GideonSamid, Gary Wnek, Material Research Society Bulletin 9 Apr. 2019.

This methodology will allow the mint to prepare many copies of the coin image database, copies that would be complete but without the payload. The payload will be kept in the rock of randomness. If case one has to reconstruct the coin image database, the proliferated copies and the physical rock will be sufficient to do so.

The methods to keep track of fbits redeemed v. fbits not redeemed will be based on fbit status records, as indicated in the continued patent application.

Process

The decentralized (or distributed) mathematics digital currency, DMDC, also named LeVeL: Legacy Extended Value—Entrusted Ledger is played out via (i) a mint, and (ii) money traders. It involves: (a) a LeVeL management system, (b) a LeVeL public ledger, LeVeL coins, and (c) a purchase/redemption currency. The LeVeL process is happening in a society of reference.

We first describe (i) the basic LeVeL process, then (ii) the split extended LeVeL process, and additional topics.

The Basic LeVeL Process

The basic general LeVeL process (Process-Basic) is as follows: a given society of reference is trading with a trusted currency, C, referred to as the underlying currency. An organization within this society offers to the society a DMDC service and is regarded as a mint. A member of the society, regarded as 'trader 1', $Tr_1$, pays the mint an amount x of the trusted currency C. In return the mint passes to $Tr_1$ a digital coin X of value x=|X|. Trader 1 will then pass coin X in whole to $Tr_2$. $Tr_2$ will pass X to $Tr_3$, and on to $Tr_i$, where i=1, 2, . . . r. Trader $Tr_r$ will return the coin to the mint, and in exchange the mint will pass to $Tr_r$ an amount x of currency C. Thereby the cycle of coin X has been concluded.

The LeVeL process is such that traders $Tr_2$, $Tr_3$, . . . $Tr_r$, are satisfied that the digital coin X passed to them from $Tr_1$, $Tr_2$, . . . $Tr_{r-1}$ respectively is bona fide, not a double-spent coin an not a counterfeit. This transfer of trust, 'payee chain satisfaction' is the fundamental merit of the LeVeL process.

LeVeL Transfer of Trust

Trader 1, $Tr_1$, gains her trust from the mint who passed to them the digital coin X. Subsequent trader i, receives the coin X from trader $Tr_{i-1}$. How then does trust transfers from the mint to trader $Tr_i$?

Trust is transferred via a trustworthy chain of custody for coin X in the form:

$t_0$ coin X was issued to $Tr_1$
$t_1$ coin X was transferred from $Tr_1$ to $Tr_2$
$t_2$ coin X was transferred from $Tr_2$ to $Tr_3$
. . .
$t_{i-1}$ coin X was transferred from $Tr_{i-1}$ to $Tr_i$ Trader $Tr_{i-1}$ passes to $Tr_i$ this is the complete chain of custody. The chain proves that Trader (i−1) is within his rights to pass the coin further.

The heart of the LeVeL process is the cryptographic means by which this chain of custody is constructed so as to convince $Tr_i$ that the coin transferred to them from trader (i−1) is bona fide.

As discussed each trader identifies themselves as an owner through a private/public key procedure, where the public key is listed in a LeVeL public ledger.

The chain of custody is built on trader's information that reflects nothing more than the right of ownership from the moment the coin was passed to a trader to the moment when the coin was passed from them to the next trader. No identification marks as to the real, clear or vague identity of trader. The anonymity is complete all the way from $Tr_2$ to trader $Tr_{r-1}$. Payors may not know who their payee is, and payees may not know who their payor is. The mint is clueless as to the identities of $Tr_2$ to $Tr_{r-1}$. As discussed the cryptanalytic protection of the process is quantum safe; it is based on a novel principle in which each trader is responsible for his own cyber security, selecting his or her own cryptographic protection.

As to trader 1, anonymity may be established by having $Tr_1$ pass the amount x of currency C without self identification. Same for the anonymity of trader r. By passing to her the amount x (as coin X is being redeemed), without identifying $Tr_r$, the anonymity of trader-r is preserved. The prevailing regulators may approve or reject this anonymity, but will be powerless vis-a-vis the anonymity of the in-between traders.

Such sweeping anonymity is nonetheless curtailed by the ability of the trust to refuse redemption to coins for whatever reason. Should the mint wantonly exercise such refusal, then it would lose the trust of the traders, and will not be used. Therefore a viable mint will reserve the right to refuse redemption only to cases that would be agreeable to the community of traders at large. Such are instances where a crime or abuse is credibly suspected.

There is a possibility that a great deal of criminal activity and abuse will be carried out under the blanket of anonymity offered by LeVeL. It would be done stealthily without raising any suspicion. To counter this possibility mints and/or the authorities under which mints operate may impose anonymity restriction rules.

Anonymity Restriction Rules

The following rules may be applied in any combination to curtail anonymity to the desired level.

Rule #1: The redeemer will have to be identified, exposed $(Tr_r \rightarrow Tr_r^e)$.

Rule #2: The purchaser will have to be identified, exposed $(Tr_1 \rightarrow Tr_1^e)$.

Rule #3: Payees will have to ascertain the identity of their payors.

Rule #4: Traders will have to be registered with the mint.

Rule #5: Randomized Forced Exposure.

Rule 6: requiring "identity hooks".

Rules #1,2 express the KYA—Know Your Customer procedure which is common in many places. These two rules remove the min-to-anonymity from $Tr_1$, to $Tr_r$. Anonymity is maintained for $Tr_2$ to $Tr_{r-1}$. If r=3, then $Tr_2$ may be fraudulent. However since $Tr_1$ and $Tr_1$ are exposed, it would be straight forward to investigate from these two ends to flush out any fraud on the part of $Tr_2$. However, fir r=4, then the transaction $Tr_2 \rightarrow Tr_3$ will remain unexposed since it is carried out between two traders that remain unknown to the mint. In practice, investigators working from both ends ($Tr_1$, $Tr_r$) may work their way through the chain of custody and spot fraud or abuse.

By adding Rule #3 to the first two then an investigator will be able to work her way from $T_r$ which is known to the mint to $T_{r-1}$, and continue backwards to flush out any fraudulent transaction in the middle.

By applying Rule #4, traders lose all anonymity vis a vis the mint, but maintain it towards the payors and payee and towards society at large. In a way rules #3, and #4 are the opposite approaches to curtailing anonymity. One keeps it towards the mint but exposes it towards fellow traders, and the other works the opposite way.

Rule #5 is a powerful and fair way to prevent widespread abuse of anonymity. Accordingly a random process will select outstanding digital coins to be decreed as redemption-must. Namely their owner will have to redeem its coin with the mint. The redemption will entail identity exposure, and a following investigation. If all is right the redeemer may per their choice receive a new digital coin with the same denomination. Honest traders will go through this exchange. Fraudsters are likely not come forth and lose the money instead. Anyway this randomized procedure will make the LeVeL platform unattractive to fraudsters.

Rule 6 may involve a submission of a verifiable email address for the traders.

Anatomy of the Basic LeVeL Coin

The basic LeVeL coin follows the BitMint digital coin structure: a capsule and a payload. In the nominal BitMint coin a chain of custody is optional and it may be added to the capsule. For the LeVeL coin the chain of custody is essential and it is added as a third element:

[LeVeL coin]=[capsule][payload][chain of custody]

It is possible to operate the LeVeL coin without a payload, but the payload (i) adds security, and (ii) it enables a smooth shift from the LeVeL trade to nominal BitMint trade.

The digital coin structure will feature the capsule, the payload, and the chain of custody (CoT), wrapped as needed with headers and trailers, and cryptographically signed if so desired.

The LeVeL coin is minted for transaction and trade. It is expressed (i) on the public ledger, (ii) on the computing devices of its successive owners, and (iii) its image is kept in the mint's coin repository (database).

The expression of the LeVeL coin on the ledger and in the computing machines of its chain of traders is evolving. The appearance of the LeVeL coin on the ledger is publicly exposed. The appearance of the LeVeL coin in the mint repository is mint private. The appearance of the LeVeL coin in the community of its traders is staggered. That means later traders have more informaiton than early traders.

Coin Capsule

The coin capsule on the mint's ledger is structured as follows:

$$[\text{LeVeL coin } X \text{ capsule}]:[\text{Mint ID}][\text{Coin-ID}][\text{denominated value}:x=|X|][t_0][\text{terms}][\text{admin}]$$

The Mint-ID is important in an InterMint environment where several mints operate in parallel. The coin-ID is a unique identifier that never repeats. The denominated value of the coin is the sum for which it is redeemed. It may be that purchase price will be a bit higher in order to fund the mint operation and generate some profit. $t_0$ is the minting time and date. Any terms of use to which the coin is limited are identified in the terms section. Any administrative data is added in 'admin'. This may include any coin wide cryptographic parameters. It is optional to sign the capsule per se.

Coin Payload

The payload is built in the regular BitMint way. Namely a randomness source spells out some n bits in order, and this n-bits string becomes the payload—the identity of the coin. In the basic mode LeVeL coins don't split. This is a fundamental difference from nominal BitMint coins. And hence there is no need for a valuation function. We will see in the split-enabled process that the valuation function returns along with the option to split the coin as desired.

The payload of an unsplittable LeVeL coin will be regarded as the definition of the coin, D. D will be composed of d randomized bits. D will be regarded as a private key of the coin. It will be known to the mint that sets it up and writes it in the coin repository (database) and it will be made known to the chain of owners of the coin. The public ledger record of the coin will not have D displayed, but rather a corresponding public key, D*. We use the terminology 'shadow' to express the public key of a mathematical entity (here a string of bits) that 'casts a shadow' D*=S(D). It is easy to compute the shadow from the entity that casts it and it is difficult to compute the reverse. The mint is responsible to select the size of the coin definition, |D| and the formula Fd with which to compute the shadow, D* from D: D*=Fd(D). D* may be regarded as the public key of the coin, with D as the private key. The mint keeps D in its tracking of the coin in its repository. Each trader, $Tr_i$ for i=1, 2 . . . r receives the definition of the coin D from the previous trader or from the mint for $Tr_1$. However, the public ledger displays the public key, (the shadow), D*.

D is randomized and generated ad-hoc at minting moment $t_o$. At time point $t < t_i$, D is known to the mint and to traders $Tr_1, Tr_2, \ldots Tr_i$.

Chain of Custody

The chain of custody of a LeVeL coin is structured as follows:

$$[CoT] = \Sigma [t_{i-1}][U^*_i][Fu_i][W^*_i][Fw_i] \ldots$$
$$\text{for } i=1,2, \ldots r$$

The terms $\Sigma$ signifies concatenation. $t_{i-1}$ is the time owner i-1 passes the coin to owner i.

$U^*_i$ is a public key for trader i. Trader i holds privately the corresponding private key $U_i$, $Fu_i$ is the definition of the computation procedure (the 'formula') for computing $U^*_i$ from $U_i$.

$W^*_i$ is a second public key for trader i. Trader i holds privately the corresponding private key $W_i$. $Fw_i$ is the definition of the computation procedure (the 'formula') for computing $W^*_i$ from $W_i$.

$U_i$ is regarded as 'owner's credentials' (owner certificate) ($OC_i$), namely the element of data which proves to the payee (Trader $Tr_{i+1}$) that $Tr_i$ is the current owner of the coin to which $U^*_i$ is attached in the LeVeL public ledger.

The proof is carried out via a mathematical calculation $U_i \rightarrow U^*_i$, as defined by $Fu_i$:

$$U^*_i = Fu_i(U_i)$$

The values of $U^*_i$, and $Fu_i$ are selected by $Tr_i$. This fact is a key concept in the LeVeL currency. The trader is responsible for their own security. They select the formula $Fu_i$ to be such that an attacker will not be able to extract $U_i$ from $U^*_i$. And they will have to select $U_i$ for the same purpose.

$W_i$ is regarded as 'owner's identity' ($OI_i$), namely the element of data which assigns a mark to the identity of the trader i, $Tr_i$. $Tr_i$ identified by the name $W_i$ is in possession of their credentials as the owners of the described coin from time point $t_{i-1}$ to time point $t_i$. If $Tr_i$ is the current owner than $t_i$ is not yet specified. Before $T_{i-1}$ and after $t_i$ trader $Tr_i$ has no ownership credentials, but they still go by their identifying name $W_i$. During the time interval $t_{i-1}$ and $t_i$ $Tr_i$ is using $U_i$ to prove their ownership credentials.

The proof of identity is carried out via a mathematical calculation $W_i \rightarrow W^*_i$, as defined by $Fw_i$:

$$W^*_i = Fw_i(W_i)$$

The values of $W^*_i$, and $Fw_i$ are selected by $Tr_i$. They select the formula $Fw_i$ to be such that an attacker will not be able to extract $W_i$ from $W^*_i$. And they will have to select $W_i$ for the same purpose.

The owner identity credentials, OI, do not participate in the chain of trust procedure. They are used to resolve dispute and administrative purposes, or to assist in some future investigation.

The Split Extended LeVeL Process

The basic LeVeL process allows for a LeVeL coin to be paid out in its entirety, no splitting. This imposes a trade inconvenience. It can be remedied with the Split-Enabled LeVeL trade: LeVeL*Split.

The split is enacted following the regular BitMint protocol. The coin definition D is expressed as a nominal BitMint payload. D is a bitstring d=|D| bits long, comprised of g financial-bits, fbits, where an fbits is a bit string which is at least f bits long. Hence: d<f*g. Each fbit is associated with a valuation function V. The value of the coin is then:

$$[\text{coin value}] = \Sigma V_i \ldots \text{ for } f=1,2, \ldots g$$

where $V_i$ is the value of fbit i.

The identities of the bits in the financial bits are fully randomized. And so D is interpreted as the definition of the coin, or say, the identity of the coin.

D per se is kept in the mint and it transferred to each owner of the coin at the time of assuming ownership. But the LeVeL*Split public ledger only shows the shadow of D: Sh(D)=D* along with the formula Fd to compute D* from D. The mint selects the function Fd.

This arrangement as with the regular LeVeL coin, limits the knowledge of the coin id only to the chain of its owners.

The operation of the LeVeL*Split trade is the same as the regular LeVeL trade, only that the capsule of the split coin will also feature the valuation functions, and an owner of a LeVeL*Split coin can exercise the split protocol.

The LeVeL*Split protocol involves a coin definition transfer protocol Dx whereby the coin definition D is passed in whole or in part to the two or more split coin owners after the split. Details ahead.

We start by describing a binary split where trader i, $Tr_i$, is passing coin X to traders $Tr_{i1}$, and $Tr_{i2}$, such that the first trader gets possession of a split coin denominated as $X_1$ and the latter trader gets possession of the other split $X_2$, such that:

$$V(X)=V(X_1)+V(X_2)$$

where V(Y) is the value of coin Y measured by the redeemable currency C.

Later on we will extend the split to any number n>1 of splits $X_{i1}, X_{i2}, \ldots X_{in}$ Binary Split In a binary split coin X is split to coin $X_1$ and coin $X_2$ such that the sum value of the two splits is the same as the value of the pre-split coin.

A split ready LeVeL*Split coin will have a split-ready capsule, which is the same as the non-split LeVeL with the addition of the value functions $V_1, V_2, \ldots V_g$ for all the g fbits in the coin:

[capsule of split-ready coin X]=[nominal capsule]
 $[V_1, V_2, \ldots V_g]$

Transfer of ownership for the LeVeL*Split is essentially the same as the regular LeVeL transfer of ownership, only that each split coin identifies the subset of the g fbits that it claims ownership of. The g fbits in the LeVeL*Split coin will be divided to two mutually exclusive subsets g' and g", such that g'+g"=g. Coin $X_1$ will claim onwership (and right to spend) of subset g' and coin $X_2$ will claim ownership (and right to spend) of subset g". Each split will carry the same capsule, and the same chain of custody before the split.

Owner $Tr_{i1}$ will select a public/private key formula $Fu_{i1}$, and select owners credentials $OC_{i1}=U_{i1}$, then compute: $U^*_{i1}=Fu_{i1}(U_{i1})$ Owner $Tr_{i1}$ will select a public/private key formula $Fw_{i1}$, and select owners identity $OI_{i1}=W_{i1}$, then compute: $W^*_{i1}=Fw_{i1}(U_{i1})$ The U and W values are mathematical entities, (always representable as a bit string) and so are their shadows U* and W*.

Next and immediately trader—i1 will post on the LeVeL*Split ledger their onwership claim and credentials:

[Coin $X_1$]=[capsule of coin X][identification of sub-
 group $g' \in g$][payload data][$t_i$][$U^*_{i1}$][$W^*_{i2}$]

The exact definition of the payload-data will be discussed later. The capsule may feature only the valuation functions for the fbits associated with coin $X_1$.

Simultaneously (or almost simultaneously as discussed later) Owner $Tr_{i2}$ will select a public/private key formula $Fu_{i2}$, and select owners credentials $OC_{i2}=U_{i2}$, then compute: $U^*_{i2}=Fu_{i2}(U_{i2})$.

Owner $Tr_{i2}$ will select a public/private key formula $Fw_{i2}$, and select owners identity $OI_{i2}=W_{i2}$, then compute: $W^*_{i2}=Fw_{i2}(U_{i2})$ and immediately post on the LeVeL*Split ledger their onwership claim and credentials:

[Coin $X_2$]=[capsule of coin X][identification of sub-
 group $g'' \in g$][payload-data][$t_i$][$U^*_{i2}$][$W^*_{i2}$]

Here too the capsule may omit the valuation functions for the fbits not included in coin $X_2$.

The LeVeL*Split public ledger will now show that coin X is no longer in possession of trader $Tr_i$, but rather in possession of Trader $Tr_{i1}$ who claims ownership to subgroup g' of the g financial bits in X, and to trader $Tr_{i2}$ who claims ownership to subgroup g" of the g financial bits in X.

The two present owners of parts of coin X can each now come forward to the mint requesting to redeem their parts of coin X.

Alternatively the two split traders will be able to further transfer the coin in their possession to their next owner. Such transfer can be done in whole (without split) or be another exercise of the split protocol.

For the split to work it is necessary that the LeVeL*Split ledger shows a proper accounting for all the fbits in the pre-split coin. If a split is submitted for redemption then the mint will check that all the fbits in the coin or part of the coin submitted for redemption are properly accounted for in the LeVeL*Split public ledger. $Tr_1$ will not be able to claim $X_1$ and claim the value indicated by the g' group of X fbits, unless the remaining fbits of coint X, namely the g" group is properly listed in another coin, namely $X_2$. Both coins $X_1$ and coin $X_2$ show time point $t_i$ as the moment of assuming control of their portion of coin X. That is, the split is a single event, and time of transfer of ownership is shared by the two split owners.

This implies that trader $X_i$ cannot pass ownership of subgroup g' of fbits to trader $Tr_{i1}$ and keep the rest, subgroup g" of fbits in his or her possession. If that is the desire of trader $Tr_i$, then they will have to pass subgroup g" to themselves and appear as trader $Tr_{i2}$. In other words, in that case we have:

$$Tr_i = Tr_{i2}$$

Trader "i2" will have to select new ownership credentials, but may keep, if so desired the identity credentials, IC:

$$OC_{i2} \neq OC_i$$

$$IC_{i2} = IC_i$$

When trader $Tr_{i1}$ will pass its coin $X_1$ to trader $Tr_{i1+1}$, then the latter will have to receive from the former the usual proof of proper ownership namely the coin payload, the ownership credentials of all the owners of the coin $Tr_1, Tr_2, \ldots Tr_i, Tr_{i1}$. Note: the identity credentials are not part of the proof of ownership protocol used for coin transfer or coin redemption. $Tr_{i1+1}$ checks the credentials out, and accepts the coin if all is well, all the credentials check out. Rejects it otherwise.

Following the split the two split coins chart each their own path. They still share their common history from trader $Tr_1$ to trader $Tr_i=Tr_s$ when the split took place.

The LeVeL*Split protocol is iterative.

Splitting a Split Coin

Coin $X_1$ which is a split from coin X may in turn be split again to coin $X_{11}$ and coin $X_{12}$, such that the sum values of the new split is equal to the value of $X_1$:

$$V(X_1)=V(X_{11})+V(X_{12})$$

This will take place by trader $Tr_{i1}$ splitting the g' fbits they own to two sub groups: h' and h" where:

$$h'+h''=g'$$

Trader $Tr_{i11}$ will be receiving possession of group h' of fbits in X and trader $Tr_{i12}$ will be receiving possession of group h" of fbits in X. Trader $Tr_{i11}$ will be receiving the chain of ownership credentials from $Tr_1$, to $Tr_i$, plus the ownership credentials of $Tr_{i1}$ for the g' subgroup of fbits in coin X. If all checks out then trader $Tr_{i11}$ will accept the subgroup of fbits, h', as proper payment. Trader $Tr_{i11}$ will generate their own ownership credentials $OC(Tr_{i11})$ and identity credentials ($IC_{i11}$) and post on the LeVeL*Split public ledger their claim of ownership of the h' subgroup of fbits Similarly for trader $Tr_{i12}$, which might perhaps be a $Tr_{i1}$—selling group of fbits h" to himself.

Trader $Tr_{i2}$ will pass its fbits (group g") to two parts k' and k" such that:

$$g''=k'+k''$$

This iterative split will continue until a split is redeemed or a split coin reached its maximum split capability which happens when a LeVeL*Split coin is comprised of only one fbit.

The mint in its repository will keep track of all the fbits. A redeeming trader will have to show the mint that it is in possession of all the ownership credentials of the chain of custody before them, and present the payload, which will be at least the identities of the bits that make up the group of fbits claimed for redemption.

A payee of a split coin will be expected to check the ledger to see if the passed fbits are not claimed by any other trader on the ledger. That is why a trader cannot pass part of their fbits and keep the pre-split coin alive. In that case the same fbits claimed by the split coin will also be claimed by the pre-split coin. It is necessary then to split a coin by re-passing the left over (after the split) portion to the pre-split owner under new ownership credentials. If the fbits in the paid coin split have a current claim of ownership elsewhere on the ledger then the payment should be rejected.

Multi Split

A multi split can be exercised by repeating a binary split:

Trader Trq wishes to split coin X to traders $Trq_1$, $Trq_2$, ... $Trq_n$, splitting the g fbits in coin X to $g_1, g_2, \ldots g_n$ respectively so that trader $Trq_i$ is allotted fbits in group $g_i$ and where:

$$g=\Sigma g_i \ldots \text{ for } i=1 \text{ to } n$$

To do so trader Trq will split coin X to coin $X_1$ that goes with fbits group $g_1$, and to coin $Y_1$ which goes with fbits ($h_1=g-g_1$). The owner of split $Y_1$ will be the same owner of coin X, namely trader Trq. Trq will be identified through their own new ownership credentials and perhaps through the same identity credentials.

Next Trq will exercise another binary split of the remaining $h_1$ fbits from X. This coin, $Y_1$ will be split to coin $X_2$ that will be given ownership of fbits in group $g_2$, and the left over coin $Y_2$ which will be given ownership of fbits in group $h_2=h_1-g_2=g-g_1-g_2$. Again the owner of $Y_2$ will be the presplit trader Trq. $Y_2$ will be posted on the LeVeL*Split public ledger with its new own ownership credentials (while the owner of the left over coins $Y_1, Y_2, \ldots$ is the same (Trq), each will be featured with their own ownership credentials).

This splitting protocol will continue. Coin $Y_2$ will be split to coin $X_3$ and coin $Y_3$, and so on for $X_i$ and $Y_i$ for $i=1, 2, \ldots (n-1)$. Trader Trq, the owner of Coin $Y_{n-1}$ will be passing this coin to trader $Trq_n$ as a full coin transfer, no more splits.

The net result of this iterative splitting is that coin X owned by trader Trq was split to n traders $Trq_1, Trq_2, \ldots Trq_n$ as planned.

This iterative process can be replaced by a direct mutli split operation.

Direct Multi Split Operation

The operation is similar to the binary operation.

Trader Trq wishes to split coin X to traders $Trq_1$, $Trq_2, \ldots Trq_n$, splitting the g fbits in coin X to $g_1, g_2, \ldots g_n$ respectively so that trader $Trq_i$ is allotted fbits in group $g_i$ and where:

$$g=\Sigma g_i \ldots \text{ for } i=1 \text{ to } n$$

To do so in a direct multi split Trq will pass all its ownership credentials chain to each and every one of the n split coin traders. Assigning to trader $Trq_i$ fbits of subgroup $g_i$. The n traders will each generate their own ownership credentials and identity credentials and each post their split on the LeVeL*Split public ledger.

Trader $Trq_{i1}$ the prospective payee relative to $Trq_i$ as payor will check that all the fbits of group $g_i$ that are claimed by trader $Trq_i$ are not currently claimed by anyone else. Only if this check is completed satisfactorily will $Trq_{i1}$ accept the coin (whole or split) that $Trq_i$ seeks to transfer to them.

Much like in the binary split all the information in the original digital coin X is passed on to every split. Every split will see the chain of custody of the coins that are ancestors to that split, namely its payor, and then the payor of the payor, on and on up to the original trader of X, $Tr_1$. Chain of custody of side branches will not be listed in the split chain of custody. So each split will have all the information needed to pass that split coin to the next trader or to request its redemption from the mint.

The direct multi split is also iterative much like the binary split.

Coin Definition Transfer Protocol

In the regular LeVeL protocol, the payor passes to the payee the definition of the transacted coin, D. The payee will verify the identity of D by applying the coin identity formula Fd and computing Fd(D). If the result is D* as posted in the public ledger for that coin, then the payee is persuaded that the payor has ownership of the coin and is aware of its identity, definition, D.

We consider a case where coin X, owned by trader Trq is split to $X_1$ and $X_2$, with trader $Trq_1$ and trader $Trq_2$ owning these splits respectively, such that the first trader owns subgroup $g_1$ of the g fbits in X and the second trader owns subgroup $g_2$ of the g fbits in X. The question now arises as to the nature of the payload (coin definition) that is passed to the two split owners.

We outline several options:

1. Shared definition 2. Ignored Definition 3. Split Definition 4. Compositve Protocol According to the choice above the payload for each split coin (D*) will be determined.

Shared Definition

In this mode every split coin owner will receive the full definition of the original coin, so that as payee the recipient trader will be able to verify that the coin definition, D, passed to him from the payor fits the shadow of the definition, D* as it appears on the original coin.

This implies that a trader with only a few or even with only one fbit coin will see the full definition of the entire coin.

Ignored Definition

The ignored definition option is simply to not include the coin definition in the package submitted by the payor to the payee, relying for security only the security features deployed by the chain of successive coin owners. In this case the payload-data will be null.

Split Definition

In this mode the full coin definition D will be replaced with g coin definitions where g is the number of fbits in the original coin. So fbit i comprised of f bits displaying one identity string among 2f possible strings will serve as an input to a 'shadow formula' Ff, which will compute a shadow fbit*$_i$, which will be posted with the original pre-split coin X where i=1, 2, . . . g.

$$fbit*_i = Ff(fbit_i) \ldots \text{ for } i=1,2,\ldots g$$

Trader Trqj receiving fbits in group $g_j \in g$ (the group of fbits in the original presplit coin x) will be given the identities of the bit strings of the fbits in group $g_j$. Trader Trqj will then check at the LeVeL*Split public ledger whether the fbit definitions given to him by the payor trader, Trq, all compute properly to the respective shadows of the fbits as posted on the ledger. Only if they all pass the test should the payment be accepted.

This solution creates an extra information load on the coin, but it limits the visibility of a trader to the parts of the original payload that is passed to them.

Composite Protocol

The above described protocols may be combined in several ways. The shared definition might be applied to split coins above a certain threshold of value, where below that value the ignored definition will take place. The split definition could be applied to a groups of fbits, not to individual fbits. Split coins of lower denomination will be using the 'ignored definition' mode.

Traders' Process

The entire LeVeL setup is designed to serve society, through empowering members of society to become traders, pay and get paid money with a sense of anonymity and freedom. The LeVeL system will be judged by its service to those traders. The traders on their parts need to take action. We distinguish among the following traders:
1. The original LeVeL coin purchase, $Tr_1$ 2. The redeemer trader, who redeems the LeVeL coin, $Tr_r$. 3. The in-between traders: $Tr_2, \ldots Tr_{r-1}$ All traders share the following actions:
(i) Generating owner credentials and their shadows (ii) Generating owner identity and its shadow (iii) Posting their ownership status on the LeVeL public ledger (iv) Verfing bona fide status of their payor (v) Exercising the LeVeL protocol as payor (except for $Tr_r$) (vi) Responsive to mint summons and invocations Shared Traders Protocols
All traders share the following actions:
(i) Generating owner credentials and their shadows (ii) Generating owner identity and its shadow (iii) Posting their ownership status on the LeVeL public ledger (iv) Verifying bona fide status of their payor (v) Exercising the LeVeL protocol as payor (except for $Tr_r$) (vi) Responsive to mint summons and invocations Generating Owner's Credentials Every LeVeL coin owner is required to tend to their own security by selecting a mathematical entity U, and a formula F to apply to U and compute from it a mathematical entity U*.

$$U^* = F(U)$$

The selection of U and F should be such that given U* and F, it will be infeasible to reverse compute the corresponding U, or any other mathematical entity U' such that U*=F(U').

The selected values of U and F are used to compute U* and post U* as ownership credentials for a given LeVeL coin.

When the LeVeL coin owner represents to their payee that they are the rightful owner at the time of the transaction, he or she backs this claim by presenting U. The payee will read U* since it is posted along with F with relationship to the coin on the LeVeL public ledger. The payee will readily compute F(U) and if the result matches U* the payee is persuaded that the party approaches him is likely the rightful owner. The protocol further requires that the owner credentials of all previous coin owners will be submitted to the payee.

The challenge for the owner is to select an effective F that must be a reliable one-way function, and select a corresponding U.

In theory there are infinite number of working F functions. Prior mathematical analysis will define a range of formulas F-range, and a range of U values, U-range, such that the owner will be able to randomly or otherwise select a particular F from the F-range and a particular U from the U-range.

Should it turn out that attackers succeed in some cases to reverse compute U from U*, then the community of traders together with the mint will refresh their recommendations for the F-range and the U-range. The infeasibility hurdle is unbound, and whatever the assets of the attackers, there are plenty of F and U candidates to pose an effective selection.

In practice the LeVeL coin trade happens within a computing environment, like a phone app. This environment will be loaded by an F-range and U-range to select from automatically without bugging the human trader.

Generating Owner's Identity

The owner's identity is not used in the payment process. It is needed for subsequent identification of ownership and for administrative purposes. There are several versions:
1. Full identification 2. Group Identification 3. Communication Identification 4. Obscure Identification An owner may choose to fully identify themselves. The reason for it might be that they trust the LeVeL protocol more than they trust the nominal BitMint protocol. Also an exposed owner can readily pass the coin to themselves, only with a hidden capacity this time. For example: A trader holds a $10,000 coin with full identification of himself as the owner. He then wishes to make an anonymous contronition to a social cause. The owner will then split the coin to $8,000 coin to be held by him, again with full exposure of identity, and a $2000 coin, held by the same owner but here with obscure identification. Next the $2000 will be passed in favor of the preferred cause so that the identity of the contributor is not known.

Group identification may be used in order to highlight the fact a payment is made on behalf of a group, perhaps from a group budget, not from a particular individual.

Communication identification is an id designed to enable communication mainly with the mint, but in fact with anyone reading the public ledger. This id may be in the form of an email. And then it can readily work for two ways communication. The email may be one sent from an identity hiding service. The owner will identify himself with an email to this identity hiding service. The service will generate an opaque email, to be used as the ownership identity so that the email as posted will not lead back to the actual identity of the owner (by comparison an email john.Doe@gmail.com points to the name of the owner. Other than emails there are ways to enable communication via bulletin board and other known techniques.

Obscure communication will be used to give the owner the option at their discretion to come forth and announce themselves as the particular owner. They would do so with the public/private key mechanism as described for the ownership credentials. The responsibility of the trader will be to select a mathematical entity W and a formula F, then compute $W^*=F(W)$, and post $W^*$ (along with F) as the obscure identification of the owner. At will the owner can prove their ownership at the time they owned the coin, by submitting W to a party that would readily compute F(W). If the result of the computation is the ledger posted $W^*$ then the owner identity claim is honored. Here too a one-way function service will post a range for formulas F and mathemtical entities W.

Posting on the Ledger

The LeVeL coin ledger is run by the mint. It is frequently updated as coins are transacted. There are the following ledger management modes:

1. Mint only 2. Traders' direct 3. Multi-Ledger

In mint-only mode, traders communicate their ownership claims to the mint (in a variety of modes). The mint checks the claims and posts them on the mint.

In trader's direct the traders post on the ledger directly without vetting their posting with the mint.

Multi Ledger

There are several modes for multi ledger:

1. coin group mode 2. tentative mode

In a coin-groupings the general LeVeL coin ledger will be divided to groups of coins. The grouping can be done in various ways. One way is based on trade behavior. The evolving ledger will identify groups of traders (by their owner's identity mark) which trade with groups of coins, and build a sub-ledger for those coins. The rational is that much activity happens between traders that are closed to each other geographically. While they may not know many details about the people they pay to and get paid from they may know something about them. This grouping will make scanning faster in most cases. Such grouping may prove advantageous in situations of emergency and limited global connectivity.

Tentative mode works as follows: the mint is maintaining the official version of the LeVeL ledger. Next to it there is a trader-controlled version of the same. In the traders-controlled version traders post their ownership claims as soon as they get possession of a coin. The mint examines the trader controlled ledger every period of time M. When the mint reads the traders' controlled version, it analyzes it for inconsistencies. If none is found the mint copies the updates of the ledger to the official version. If inconsistencies are found then they are isolated. The consistent updates are added to the official version of the LeVeL ledger, and the inconsistencies are routed to the LeVeL resolution center, a function management by the mint to handle inconsistencies.

Verifying the Payor

The viability of the LeVeL coin system is based on the robust ability of the payee to verify that the purported payor is bona fide.

In the LeVeL protocol a payor proves their bona fide status by (i) submitting to the payee the coin definition D, and (ii) submitting to the payee the ownership credentials of all the traders that held the coin from its minting to the present. For LeVeL*Split, the payee should get the ownership credentials of all the owners who owned the fbits of the paid coin.

The payee, trader (i+1), $Tr_{i+1}$ will prompt the payor, $Tr_i$, to submit all the above, namely D (the coin payload), $U_1$, $U_2, \ldots U_i$, to the payee.

The payee will read in the coin capsule Fd the formula used by the mint to compute the shadow $D^*$ of the coin definition D, and compute Fd(D), if the result is the same as the ledger posted shadow $D^*$ then the payee is convinced that the payor knows the definition of the coin they are trying to pay.

Next the payee will read $Fu_j$ and $U^*_j$ from the LeVeL ledger, and compute $Fu_j(U_j)$, if the result is the same as the ledger posted $U^*_j$ value, then the payor successfully proves to the payee that they have the ownership credentials of owner i, $Tr_i$. If this test is successful for j=1,2, ... i, then the payee is convinced that the payor is in possession of the ownership credentials of all the historic owners of the coin, and therefore the paid coin is bona fide.

If any of the above tests fails—the payment is rejected.

The communication between payor and payee may be through physical contact without giving each other details of identity, or it may be in cyber space using Diffie Hellmann, Merkle, or FigLeaf as cryptography between strangers. Or cyber space through email or web connection, etc.

Paying the LeVeL Coin

In the regular LeVeL protocol. payment is restricted to full coin passing. The payor will establish a communication channel with the payee, identify to the payee the coin-ID to be paid, and pass to the payee the coin definition D and the ownership credentials of all the historic owners and the current owner of the coin $Tr_1, Tr_2, \ldots Tr_i$, namely passing $U_1, U_2, \ldots U_i$ The payor will then wait for the payee to signal that the tests of ownership passed successfully. Depending on the requests of the payee and the denomination of the coin, this transaction will be regarded as settled after some period of time $\Delta t$ in which no challenges to the payee claim of coin ownership have been posted.

The payor will mark for himself that this particular coin has been paid out.

For the LeVeL*Split protocol, the ownership credentials will have to be passed along to all the recipients of the split, one or more of them may be the payor himself. So will the coin payload, according to the payload passing protocol for LeVeL*Split. Each split owner will be receiving from the payor the indication of the subgroup g' allocated to them from the g fbits that are originally minted for the coin (g'∈g).

Receipts

Payors of LeVeL digial coins will be able to claim a receipt from the payee. The payee will identify themselves with their owner identity credentials, W, that would match the public shadow of the same, W*, and assert receipt of the paid money from the payor identified by their owner identity credentials. Such a statement will be a proof of spending the money, it may specify what the money was spent for, and might be satisfactory for accounting purposes, without identifying the full identity of the payee.

Trader Mint Interactions

Traders $Tr_2, Tr_3, \ldots T_{r-1}$ have no nominal communication with the mint. The mint may not know who they are and hence cannot initiate communication. This is true for the case where the r−2 interim traders are hiding their identity. The LeVeL system though requires communication options between the mint and these r−2 interim traders. Such will happen in the following cases:

1. the ledger shows an ownership challenge 2. refreshing calls 3. coin revocation Trader's Response to Ownership Challenge The LeVeL ledger may show a challenge for trader $Tr_i$ holding the credentials for some coin X.

If the trader has not willfully passed the challenged coin X to a payee then the challenge is false. It may be a result of the following:

1. Compromising the trader's computing device 2. Extracting all the private keys from the public keys 3. A False claim by a challenger who does not have all the credentials needed to make a payment.

It is necessary for a coin holder to frequently check the LeVeL ledger to see if a challenge is posted. The trader's computing device will be programmed to check the ledger with a preset frequency. If a challenge is posted, then the challenged trader will need to react. The only address to appeal to is the mint.

Using their trader's identity credentials the challenged trader will communicate to the mint that a false claim was posted on the ledger. The mint on their own will not know that a new line stating that coin X is no longer owned by trader y, but rather by trader z, is false. The one to alert the mint is the compromised trader.

Upon such alert the mint will activate the dispute resolution protocol. As a result of this mint intervention the falsely challenged trader may be having to refresh its coin, namely to redeem the challenged coin X against a different digital coin X' of same value: V(X)=V(X').

If unsatisfied the challenged trader can always turn to court for help since the mint operates in good standing in its social environment.

Refreshing Calls

For a variety of reasons a trader might initiate a request to the mint to refresh its coins, or alternatively the mint out of its own concern will offer or insist on coin refreshment.

The common reason for refreshment is consolidation. A trader holding m coins with denomination $|X_1|, |X_2|, \ldots |X_m|$ may return, redeem them all against a new single coin of denominaion IN where:

$$|X| = \Sigma |X_i| \ldots \text{ for } i=1, \text{ to } n$$

The mint may have its own reasons to insist on refreshment, mostly of the coin definition was suspected compromised.

A trader initiated refreshment will start a mint-trader dialogue automatically. But a mint initiated refreshment might pose a problem to the mint. If the owner identity is an email or otherwise allows for the mint to initiate a communication dialogue with the trader, then there is no problem. But if the ownership identity is unrevealed to the extent that the mint has no means to connect to the challenged trader then the communication will have to start from the trader.

If the false challenger stole data from the rightful coin owner or compromised the public keys then the resolution will be a greater challenge for the mint. If the false claim is missing any of the necessary credentials the resolution will be easy.

Coin Revocation

There may arise circumstances for the mint to insist on coin revocation whether against full redemption to the rightful present owner or not. The affected trader will rely on frequent check of the ledger, where such revocation will be announced. Otherwise the trader will find it only when it is time for them to pay the coin further.

One mode of revocation is taxation, and the other is mint-fee. In both cases a randomization process may be activated to randomly choose coins slated as state tax or as mint fee. The randomization taxation will offer a fair but unavoidable collection of an exact percentage of taxes. While the mint—and by extension the government—will not know who owns which coin, the tax authorities could confiscate any coin as taxes. The randomized selection deflects any complaints, and makes the tax collection fair—not progressive and not regressive, every one over time pays the same percentage of their LeVeL coins wealth.

The fee option can be used instead of invoicing the digital coin buyer. It will be more fair, traders will pay in proportion to how much money they hold in LeVeL coins and for how long. The randomized taxation or fee collection may be done on small amount of money, possibly with a resolution of fbits.

For a variety of reasons the mint may impose an expiry date on coin, following which the coin is not tradeable.

Trader-1 Protocol

The purchasing trader, $Tr_1$ will be paying the denominated value V(X) of the coin X he requests the mint to mint. In addition the first trader might be asked to pay a fee for the service provided by the mint. In many places the purchases must identify themselves to the mint, by regulation. It would also be easier on the payment for the coin, if identity of the first LeVeL trader is identified. Albeit, the first trader can immediately pass the coin to the second trader, which may be themselves, only that the second trader's identity is not known to the bank and to anyone.

Redeemer Protocol

The redeemer trader $Tr_r$ will present their credentials to the mint, but will also have to present a means to be paid in currency C for the redeemed coin per its denominated value. In most payment environments the mint will have to ascertain the identity of the redeemer, especially for large sums.

The process is the same for redeemer who bring only a split coin for redemption.

The Mint Process

The mint is

1. Setting up the LeVeL protocol, and rules of operation. 2. Mints LeVeL coins 3. Redeems LeVeL coins 4. Handles the payments in the underlying currency C 5. Establishes the coin image database 6. Establishes and manages the coin ledger 7. Resolve Disputes and payment challenges 8. Provides auxiliary services The mint operates as an accredited body in society, it is subject to the prevailing court systems, so it must prepare a detailed plan, mostly readable by prospective traders, that identifies the protocol and the rules of operation. Based on these rules traders will decide if they wish to play along.
Minting and Redeeming Coins These are the boundary actions in the life of a LeVeL coin. The mint will decide if they insist on exposure of the purchasing trader, trader 1, and of the redeeming trader, trader—r.

Both actions involve payment in the underlying currency C. The mint may insist on terms and restrictions for both boundaries. Purchasers and redeemers may be restricted to individuals who are vetted in some process outside the mint. This is for the purpose to minimize abuse of the anonymity offered in the LeVeL system. In that case the dialogue for purchasing and redeeming of coins will involve proof of eligibility by the traders.

Minting a LeVeL Coin

Upon request to mint coin X of value V(X), the mint will:
1. verify eligibility of the requesting traders. 2. Receive from the requester, trader—1, $Tr_1$, the sum V(X) in the underlying currency C. 3. Design and build the payload and its shadow 4. Impose any terms on the transactions of the coin 5. Build the coin capsule 6. Build the image of the coin as an added record in the LeVeL coin database 7. Pass the minted coin to $Tr_1$
Design and Build the Payload and its Shadow For non-split LeVeL trade the coin definition (the payload) may be of any size sufficient to deter brute force attack. It is more secure if the size of D is not known and not discernable from its shadow D* which is exposed in the ledger.

The mint will have to choose a proper formula Fd to compute D*=Fd(D).

For the LeVeL*Split coin the design of the coin definition will involve a selection of split resolution. For coin X of value V=V(X), the desired resolution may be v, namely a trader will be able to split from X no smaller amount than v. This will dictate the coin to be comprised of π=V/v fbits. (v will divide V without a remainder). Each fbit for security will have to be comprised off bits, and hence the size of the coin definition will be |D|=π*f bits The mint will have to select a shadow casting formula Fd that would make it infeasible for a hacker to find a mathematical entity D' such that D*=Fd(D').
Imposing Terms At first glance it seems that any imposed terms will only apply to the purchaser and the redeemer, Traders $Tr_1$ and $Tr_r$. Firstly the mint might impose email exposure of traders (where email access will have to be verified by responding to a test), so that if need be identity can be extracted. Secondly LeVeL money will be paid for some merchandise with the purpose not to reveal identity to the seller. However the seller in their accounting will write that they received a V amount of money from a buyer, against the merchandise they sold. If that coin will have written into tis capsule that such merchandise is not allowed to be purchased with that coin then authorities will have a word with the offending merchant. Therefore there will be a deterrence on sellers to accept money in violation of terms dictated into the coin.

Build the Coin Capsule

The coin capsule will have to feature all the parameters that are part of it. The data may be cryptographically signed by the mint, if necessary. The capsule may be wrapped with headers and trailers, and expressed in a very programmable way.
Build the Coin Image The coin image includes the coin capsule, the coin payload, and as the coin is transacted, also the chain of custody. The coin image will include the coin definition.

Redeeming a LeVeL Coin

When a coin is redeemed, its denominated value is passed to the redeemer and the redemption fact is noted as attributes of the bits in the coin definition, as is the normal way of doing so with BitMint.

The mint will verify the eligibility of the redeemer to claim the value of the coin in the underlying currency C.
Establishing the Coin Ledger The coin ledger is a prime security target and has to be handled carefully. It is a very dynamic ledger as more and more participants pay and get paid with the LeVeL currency. Coins that are fully redeemed can be purged from the life ledger and routed to an archive ledger. Split coins will remain in the live ledger as long as any fbit thereto is not yet redeemed, or as long the coin expiry date has not yet arrived.

The ledger will have to be search efficient. New status of coins will be added as added on records to the ledger. Traders' software will scan the ledger database with efficient search queries to extract from the ledger all relevant information for a given coin.

A widely queried ledger will arrange for copies of the ledger in different locals to make it fast and easy for the community of traders to have access to it
Payment Handling The flow of money in the underlying currency C will be routed to a bank account. The mint will be operating in conjunction with a financial institution to house the money and to pay it off to redeemers.
Resolving Disputes The rightful proper owner Trp is challenged by hacker Trh. at time point tp coin X is posted as owned by trader Trp, and later at time point $t_h$ the same X coin is posted as owned by trader Trh. This looks proper to anyone except trader Trp. Trp following the protocol checks the ledger frequently and finds out the fraudulent claim by Trh. Trp will contact the mint and complain.

The mint will face a need for conflict resolution. In that case the mint will force a refreshment of coin X, and stop any further transaction with X. The mint will give time for Trh to note the redemption and submit their credentials to the mint, much as Trp does. If Trh does not contact the mint in the preset time, then his posting is removed from the ledger, coin X is refreshed for coin X' of same value and given to Trp. Trp may not have to be identity exposed for that exercise.

If Trh does submit his credentials for X then two options exist: (i) Trh credentials are deficient, and the coin goes to Trp, (ii) Trh credentials are in good order. This may be because:

1. Trp actually passed coin X to Trh 2. Trh stole Trp credentials from Trp wallet 3. Trh compromised the necessary credentials.

This will be a difficult dispute to resolve. Trh will be asked to present arguments for his claim that Trp passed coin X to him, mainly by presenting a matching value that went the other way. The mint will have to write clear guidelines how to handle such a dispute.

The trader in the best position to compromise Trp is Tr(p−1), the payor for Trp. Tr(p−1) knows everything Trp knows, the chain of custody and the coin definition. In fact Tr(p−1) gave this data to Trp. The only missing information for Tr(p−1) are the credentials for of Trp, which at a minimum are ownership credentials Up, but may also include Wp. If these two are compromised then Tr(p−1) may pose as Tr(p+1), the proper new trader.

Third Party Participants

The LeVeL process may involve third party participants like:
1. Shadow Formula Providers 2. LeVeL wallet designers 3. identity hiders Shadow Formula Providers These are entities that analyze and specify good shadow formulas that will insure the infeasibility of back computing an entity from its shadow. These formulas can be used by the mint for payload shadow, may be used by traders for ownership credentials and for identity credentials.

The selected formula may be posted for public consumption. Alternatively some mathematical shop will offer for a price a well analyzed formula. Formulas are not kept in secret they are fully identified in the chain of custody.

Such formula providers will be coding various selected formulas with a clear alphanumeric tag posted on a formula public ledger. Consequently the coins will be able to reference a certain formula code, the details of which are on the public shadow ledger where the coin verifier will go to fetch them from and conduct his verification test.

Wallet Designers

LeVeL wallets will have to keep track of coins owned by the wallet owner, display such information in a dialogue friendly mode to allow the wallet owner to manage their money properly. The wallet will have to be able to exercise the verification mathematics to check if ownership credentials and coins definition (payload) submitted for verification really compute to the corresponding shadow. The wallet will also have to be able to pick shadow formulas from the formula range and pick a mathematical entity from the credentials range to be used with the selected formula, compute the shadow, and then build the updated status record for the reference coin, and further more post the update on the LeVeL public ledger.

Different manufacturers will probably compete with their superior wallet design.

Identity Hiders

In case where the mint will insist on email identification of the traders, then traders may be using a service for identity hiding. The service will get the identity revealing email or phone number of the applying trader, and return an identity hiding email for the trader to use. Alternatively the identity hiding service will present its own email and be in the middle between any communication to and from the mint and the trader.

Attack Voiding Protocols

The mint will be able to make a distinction of protocol according to the values of the coins. High denomination coins will be subject to more exacting protocol. For example coins above a certain value will require email identification, or even per mint identification of trader, so that anonymity will only hold against fellow traders. Also if problems arise the mint might take steps, like making the one way shadow functions more robust. Increasing the depths of the probes in cases of dispute.

High denomination coins will be considered settled only after longer period of time after posting a new owner, to make sure that no one is challenging the new post. Also traders with high denomination coins will be expected to check the ledger more frequently to insure that no attacker suddenly claims ownership of this expensive coins. This is not so crucial for low denomination coins.

Fitting LeVeL in its Financial and Economic Environment.

Unlike bitcoin and its ilk, the anonymity offered by LeVeL is not only more robust, it is also more law abiding. The mint is in control. The mint is an institute enjoying the public trust otherwise no one will trade with their coins. That means the mint is an institution in good standing in society, subject to all applicable laws and regulations. So traders who are unhappy with actions of the mint will have a right to sue.

The LeVeL currency is not introducing a brand new currency, it may be viewed as claim checks for the prevailing societal currency C.

There are expected to rise several, even many, mints all competing for public business. This multiplicity of mints is very good for society since it will prompt a competition between the various mints. The mints may charge fee for the anonymity service but this fee will have to be competitive. Any organization with public trust can become a LeVeL mint.

The community of mints, the InterMint will be drawn to complementarity, otherwise traders will shy away. Complementarity means that mint 1 will accept a redeemer of coin X, asking to be paid back not by the underlying currency C, by coin Y of same denomination mined by another mint. The first mint, in that case will pay the 2nd mint the amount V mint one would have paid the redeemer, and buy from the 2nd mint a LeVeL digital coin to be passed to the redeemer. This will imply a smooth cooperation between the mints, and insure stability for the community of mints competing over business.

Applications

Applications include:
1. Discrete normal behavior 2. Anonymous giving 3. Taxation and Fees 4. Tethered Money applications 5. Localized payment 6. Security It is quite common for diners, train riders, book buyers to be discrete about their doing, and not offer visa, or MasterCard a deep insight into who they are and what they do. It is simply a matter of sense of well being. Paying with LeVeL money would give such people the normal sense of anonymity they used to enjoy with cash. Given that their electronic wallet will carry the various LeVeL protocols, fast and efficiently without human intervention, such payment appears smooth and appealing. This being a widespread desire, it may make LeVeL a very popular payment option, what is more, it does not involve the risk of crypto currency, it trades one on one with the dollar or any fiat currency—it is indeed a claim check for the dollar or any other underlying currency.

Anonymous giving is quite a common need that would be readily satisfied with LeVeL trade. Givers usually prefer to give discretely lest they will be written into list of 'soft hearted generous' people and will become target of excessive solicitation. Givers to unpopular causes may prompt an adverse reaction from family, friends and employers. Often time such causes simply succumb to hackers who breach the security of the donors and then go after them. Using the LeVeL giving the recipient is not aware who the donor is.

Taxation and Fees

Both taxation and fee extraction can be applied to the LeVeL coin system. In both cases there is an option of randomized selection of fbits and coins to be marked for ownership shift to the taxing authority or the fee imposing entity.

Traders may be offered a deal. Put income money into LeVeL trading, buy coins that have redemption terms preventing their redemption for say 1 year after purchase. During this year, the 'real money' is kept with the paying agency and generates yield. Also during this period, every coin, or every fbit in every coin will stand a uniform chance to be picked out randomly for transfer of its ownership from the current (anonymous) owner to the taxing authority. The taxing authority will be guaranteed its taxation share, even without knowing who was taxed. Same for fee to help a local community, to contribute to a social cause etc. Traders benefit from the security and anonymity of LeVeL, should be willing to pay with taxes or fees for the greater global good.

The randomized nature of the fee levying, and the taxation ensures fairness.

Tethered Money Applications

Here are several possible Tethered Money applications:
1. Contribution to a social cause 2. Guided Spending 3. Discrete Investments 4. Loyalty Money
Contribution to a Social Cause The mint can decide to support a social cause by depositing all moneys paid to buy LeVeL digital coins in a fund, the yield of which is dedicated to the selected cause. By so announcing the mint encourages the public to trade with the LeVeL coins while the 'real cash' is generating interest in favor of the cause supported by all (or almost all).

To further support the cause the mint may impose a redemption limitation: a LeVeL coin will be redeemed no sooner that a given time period since it was minted. This will guarantee period of time for the money to generate interest.

Although the digital coin will not be instantly redeemable, the moral imperative of supporting the cause will contribute to its acceptability.
Guided Spending The mint will be able to impose limitation on the redeemers of its LeVeL coins. For example, only merchants from a given local are eligible redeemers. This will guide the LeVeL coin holders to spend their money in that local. Some incentives may be used to encourage the public to buy those limiting coins.
Discrete Investment The underlying currency C may be an investment instrument, like stock or a bundle of stocks. This will allow LeVeL coin holders to discreetly invest in C. LeVeL trade can be used with gold or silver as the underlying currency. This will void the need to physically store the precious metal.
Loyalty Money The mint can be an arm of a trusted merchant. The LeVeL coins will buy more in that store. In other words, a piece of merchandise in that store that cost Q$ in cash, will cost Q'<Q if paid with that store LeVeL coins.

Localized Payments

The LeVeL payment system may be implemented in local settings serving a community in a closed way. In that case the LeVeL public ledger will have to be exposed only to the community, not to the entire world. This will make it easier to set it up in times of emergency and will ensure ongoing payments in stressful crisis times.

Security

Traders might find the LeVeL setting more secure than regular BitMint trade and opt for it on this grounds only, without caring much about the anonymity advantage.

What is claimed is:

1. A method for payment of digital money involving a Mint, r money trader computing devices: $Tr_1, Tr_2, \ldots Tr_r$, and a digital coin X denominated for a value x=|X| expressed in a trusted currency C, the method comprising:

minting X, by the Mint, and passing the minted X to $Tr_1$, against a payment of x paid by $Tr_1$ to the Mint;

passing X, by $Tr_1$ to $Tr_2$, and so on by order $Tr_i$ to $Tr_{i+1}$ to $Tr_r$;

redeeming X, by $Tr_r$, with the Mint against an amount x paid by the Mint to $Tr_r$;

selecting, by each trader computing device: $Tr_i$, for i=1, 2, ... r, their own public/private key formula, $Fu_i$, and their own private key $U_i$;

computing, by each trader computing device: $Tr_i$, for i=1, 2, ... r, their own public key $U^*_i = Fu_i(U_i)$, making $U^*_I$ and $Fu_i$ public;

constructing, by the Mint, a public ledger listing X and a chain of its holders up to the present when $Tr_i$ is the current holder of X, the public ledger listing is as follows:

$$[X][t_0][U^*_1][Fu_1][t_1][U^*_2][Fu_2] \ldots [t_{i-1}][U^*_i][Fu_i]$$

wherein $t_0$ is a time that X was minted, and $t_j$ for j=1, 2, ... (i−1) is the time $Tr_j$ passed X to $Tr_{j+1}$;

and wherein the method further comprises a payment procedure of X, from trader computing device $Tr_i$ to trader computing device $Tr_{i+1}$, comprising (i) Submitting, by $Tr_i$ to $Tr_{i+1}$, the i values: $U_1, U_2, \ldots U_i$, (ii) Verifying, by $Tr_{i+1}$, that $U_k = Fu_k(U_k)$ for k=1, 2, ... i, (iii) determining that step (ii) results in positive verification of the i tests, and (iv) updating, by $Tr_{i+1}$, the listing of X in the public ledger to read:

$$[X][t_0][U^*_1][Fu_1][t_1][U^*_2][Fu_2] \ldots [t_{i-1}][U^*_i][Fu_i]$$
$$[t_i][U^*_{i+1}][Fu_{i+1}]$$

and wherein the method further comprises a redeeming procedure of X to $T_r$ comprising:

(a) submitting, by $Tr_r$ to the Mint, the r values: $U_1, U_2, \ldots U_r$, (b) verifying, by the Mint, the following r tests: $U^*_i = Fu_i(U_i)$ for i=1, 2, ... r, and (c) redeeming, by the Mint, X to $Tr_r$ based on the verifying.

2. The method in claim 1 wherein coin X is associated with an identity bit string D, and where the Mint selects a public/private formula Fd, and computes the public key, D*, associated with D as a private key: D*=Fd(D); and adds D* and Fd to the public ledger for coin X, that looks like the following:

$$[X][D^*][Fd][t_0][U^*_1][Fu_1][t_1][U^*_2][Fu_2] \ldots [t_{i-1}]$$
$$[U^*_i][Fu_i]$$

and where the Mint passes D to $Tr_1$, and each trader computing device i=1, 2, ... (r−1) is passing D to its payee trader computing device, and where each payee trader computing device checks that $D^*=Fd(D)$, and accepts the payment only when this test is positive.

3. The method of claim 2 wherein the identity bit string D is divided to g substrings regarded as financial bits, fbits, and where each substring is comprised of f bits, so that $d=|D|=f*g$, and where these fbits are assigned a value $V_i$ for $i=1, 2, g$, and where these g values are listed as part of the public ledger for X, that looks as follows:

$$[X][D^*][Fd][V_1, V_2, \ldots V_g][t_0][U^*_1][Fu_1][t_1][U^*_2][Fu_2] \ldots [t_{i-1}][U^*_i][Fu_i]$$

and where trader computing device $Tr_i$ will split coin X to coin X' and coin X", where coin X' will be defined with a subgroup of fbits $g' \in g$, and where coin X" will be defined with a subgroup of fbits $g''=g-g'$ such that the sum values of coin X' and X" is the value of X, and trader computing device $Tr_i$ will pass X' to trader computing device $Tr_i'$, and pass X" to trader computing device $Tr_i"$, trader computing device $Tr_i'$ will select a public/private key formula $Fu_i'$ and a private key $U_i'$, and compute the corresponding private key $U^*_i'$, and trader computing device $Tr_i"$ will select a public/private key formula $Fu_i"$ and a private key $U_i"$, and compute the corresponding private key $U^*_i"$, and $Tr_i$ will pass to both trader computing device $Tr_i'$ and trader computing device $Tr_i"$ the ownership credentials: $U_1, U_2, \ldots U_i$ and the coin identity string D, based on which both trader computing devices $Tr_i'$ and $Tr_i"$ will verify the bona fide status of $Tr_i$ and accept the payment, then trader computing device $Tr_i'$ will add to the public ledger for X the following record:

$$[X][D^*][Fd][\text{Values of fbits in group } g'][t_0][U^*_1][Fu_1][t_1][U^*_2][Fu_2] \ldots [t_{i-1}][U^*_i][Fu_i][t_i][U^*_i'][Fu_i']$$

and trader computing device $Tr_i"$ will add to the public ledger for X the following record:

$$[X][D^*][Fd][\text{Values of fbits in group } g''][t_0][U^*_1][Fu_1][t_1][U^*_2][Fu_2] \ldots [t_{i-1}][U^*_i][Fu_i][t_i][U^*_i"][Fu_i"]$$

and where trader computing device $Tr_i'$ will repeat the above process by dividing the g' group of fbit to subgroup h' and h" where g'=h'+h", and split the coin X' to coins X'^ and X'^^ where coin X'^ is given the fbits in group h' and coin X"^^ is given the fbits in group h", and where trader computing device $Tr_i"$ will repeat the above process by dividing the g" group of fbit to subgroup m' and m" where g"=m'+m", and split the coin X" to coins X"^ and X"^^ where coin X"^ is given the fbits in group m' and coin X"^^ is given the fbits in group m", and so on iteratively as long as a coin has fbits to be divided, and where a trader computing device will bring his split coin to be redeemed, and the Mint will pay the redeemer their split value of the minted coin X, if the redeemer provided the coin identity string and the full list of ownership credentials of all the owners of the claimed fbits from $Tr_1$ and on.

4. The method of claim 3 where each trader computing device $Tr_i$ will select a second public/private key formula $Fw_i$ and a trader identity bit string $W_i$, as a private key, then compute the corresponding public key $W^*_i$, and post $Fw_i$ and $W^*_i$ on the public ledger.

5. The method of claim 3 where the Mint will construct a coin image database (repository) which will include the coin identity string D, and where the Mint will mark as 'paid' any fbits that were already been redeemed, and mark as redeemed a coin that was split before submitted for redemption, and before redeeming any submitted coin the Mint will check that the claimed money was not previously redeemed, and will deny the request for redemption if the claimed money has been already paid before.

6. The method of claim 4 where the public/private key formula is any or a combination of the following: RSA, ECC, Lattice calculus.

7. The method of claim 4 where the public/private key formula is a hash function, or a combination of hash functions.

8. The method of claim 4 where the public/private key formula is computed from randomized data so that brute force attack is the only feasible attack for deriving the private key from the public key.

9. The method of claim 4 where the public/private key formula is comprised of a list of public/private formulas such that all the listed formulas will have to be compromised for the private key to be cryptanalyzed from the public key.

* * * * *